United States Patent
Tärnskär et al.

(10) Patent No.: US 11,047,167 B2
(45) Date of Patent: **\*Jun. 29, 2021**

(54) VACUUM INSULATING GLASS UNITS BASED ON TOPOGRAPHIC REPRESENTATIONS

(71) Applicant: VKR HOLDING A/S, Hørsholm (DK)

(72) Inventors: Ingemar Tärnskär, Hørsholm (DK); Utku Ahmet Özden, Hørsholm (DK)

(73) Assignee: VKR HOLDING A/S, Horsholm (DK)

( * ) Notice: Subject to any disclaimer, the term of this patent is extended or adjusted under 35 U.S.C. 154(b) by 0 days.

This patent is subject to a terminal disclaimer.

(21) Appl. No.: 16/970,145

(22) PCT Filed: Feb. 20, 2019

(86) PCT No.: PCT/DK2019/050062
§ 371 (c)(1),
(2) Date: Aug. 14, 2020

(87) PCT Pub. No.: WO2019/161865
PCT Pub. Date: Aug. 29, 2019

(65) Prior Publication Data
US 2020/0399950 A1    Dec. 24, 2020

(30) Foreign Application Priority Data

Feb. 22, 2018 (DK) .............................. PA201870116
Feb. 22, 2018 (DK) .............................. PA201870117

(51) Int. Cl.
*E06B 3/66* (2006.01)
*E06B 3/663* (2006.01)
(Continued)

(52) U.S. Cl.
CPC ........ *E06B 3/6612* (2013.01); *E06B 3/66304* (2013.01); *E06B 3/6775* (2013.01); *E06B 3/67326* (2013.01); *E06B 2003/66338* (2013.01)

(58) Field of Classification Search
CPC .... E06B 3/67326; E06B 3/6775; E06B 3/673; E06B 3/37365
See application file for complete search history.

(56) References Cited

U.S. PATENT DOCUMENTS

| | | | |
|---|---|---|---|
| 4,132,218 | A | 1/1979 | Bennett |
| 2009/0324858 | A1 | 12/2009 | Jaeger |
| 2017/0217816 | A1* | 8/2017 | Tian ........................ C03B 23/24 |

FOREIGN PATENT DOCUMENTS

| | | |
|---|---|---|
| EP | 0129102 A2 | 12/1984 |
| EP | 1018493 A1 | 7/2000 |

(Continued)

OTHER PUBLICATIONS

International Search Report for corresponding PCT/DK2019/050062 filed Feb. 20, 2019; dated May 16, 2019.
(Continued)

*Primary Examiner* — Donald J Loney
(74) *Attorney, Agent, or Firm* — Cantor Colburn LLP

(57) ABSTRACT

The present disclosure relates to a method of providing vacuum insulating glass (VIG) units each comprising at least a first and a second glass pane and a plurality of support pillars distributed between opposing surfaces of said glass panes to provide a gap (8) between the glass panes. A plurality of pane elements are provided, and individual topographic representations (TOPREP_2*a* TOPREP_2*n*) of each of said plurality of pane elements (2*a*-2*n*) are obtained based on input (4) from a measuring arrangement (3), and the topographic representations are stored in a data storage (DS). The stored topographic representations are processed
(Continued)

and resulting surface distance characteristic between pairs of panes are estimated. Vacuum insulating glass (VIG) assemblies are thus provided based on estimated resulting surface distance characteristics. The present disclosure additionally relates to a system.

16 Claims, 10 Drawing Sheets

(51) Int. Cl.
  *E06B 3/673* (2006.01)
  *E06B 3/677* (2006.01)

(56) References Cited

FOREIGN PATENT DOCUMENTS

| | | |
|---|---|---|
| EP | 3210944 A1 | 8/2017 |
| WO | 2013085480 A1 | 6/2013 |

OTHER PUBLICATIONS

International Search Report for corresponding PCT/DK2019/050061 filed Feb. 20, 2019; dated May 16, 2019.

\* cited by examiner

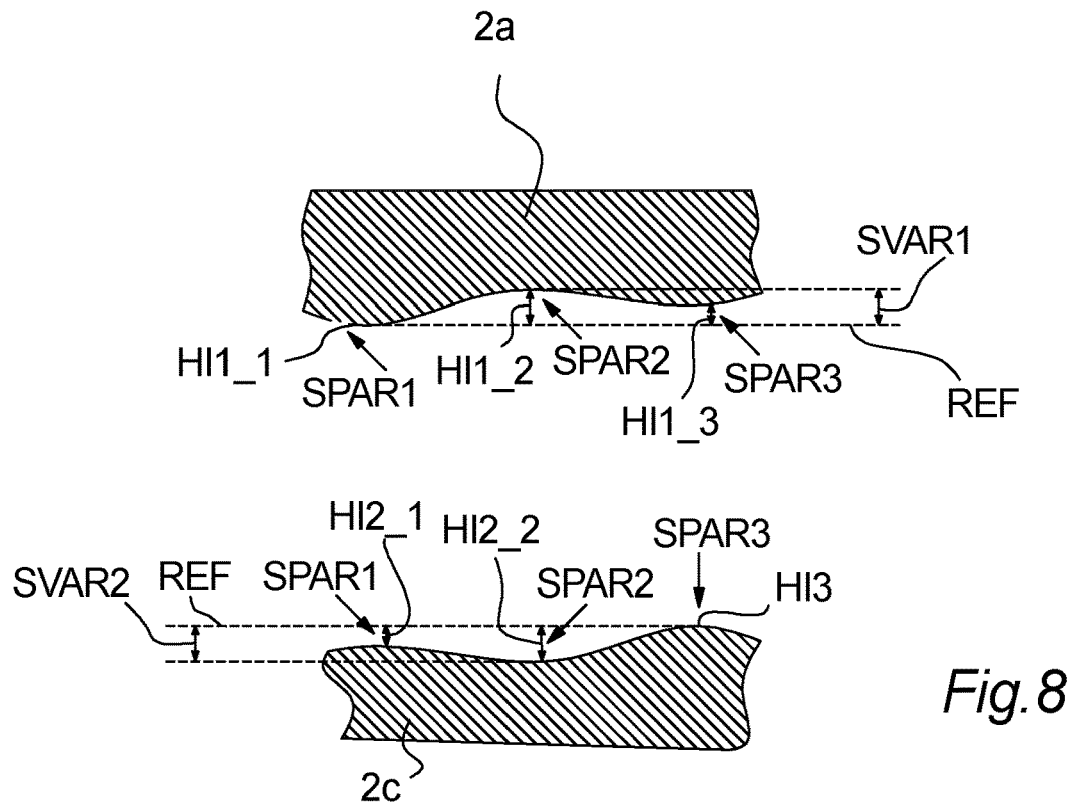
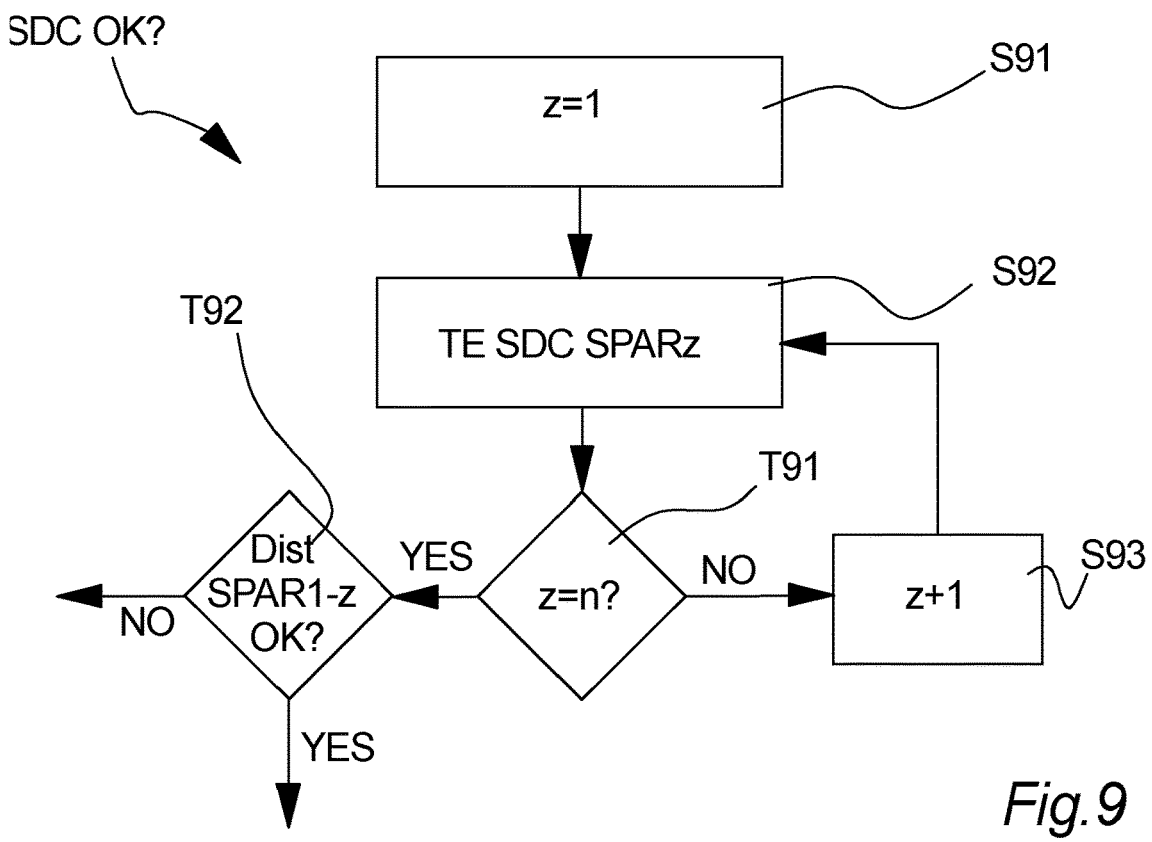
Fig. 8
Fig. 9

VACUUM INSULATING GLASS UNITS BASED ON TOPOGRAPHIC REPRESENTATIONS

BACKGROUND

The present disclosure relates to a method of providing vacuum insulating glass (VIG) units, and a system for providing manufacturing layouts for VIG units based on stored, topographic representations.

Vacuum insulating glass (VIG) units requires high quality demands in order to obtain a sufficiently air-tight and long lasting VIG units. This is especially the case in applications where the VIG unit is used for covering apertures of buildings such as window and/or door openings, as the VIG in such applications may be exerted to different conditions such as large temperature variations dependent of the geographical location of the building, and/or external forces provided by objects such as balls hitting the pane and/or weather conditions such as storms, hurricanes, hailstones etc. Such conditions may, over several years, wear on the VIG unit and thus result in undesired drawbacks. Such undesired drawbacks may be that the VIG unit malfunctions before the expected/desired lifetime of the VIG unit due to cracks in one of the panes thereby reducing or destroying the desired vacuum condition in the VIG assembly, due to scratches provided by support pillars and/or the like due to shear forces, due to support pillars falling towards the bottom of a gap between the panes or displacing between panes, etc.

EP 3 210 944 A1 discloses a vacuum plate where support structures with different heights are provided between adjacent layers. Then a sealing mixture is provided at the upper surface rim of the first plate, and the plate is then covered again to form a vacuum plate assembly. However, the solution disclosed in this document suffers from several drawbacks, as it may require a rather slow and complex solution from a large scale manufacturing perspective, and also other drawbacks such as increased pollution risks of the plate surfaces. Moreover, it might provide drawbacks in relation to providing the correct pillar height.

It may be an object of the present disclosure to provide a solution where one or more of the above mentioned undesired drawbacks are reduced or even avoided.

It may also be an object of the present disclosure to provide an improved manufacturing of VIG assemblies which may result in an improved yield of VIG assemblies having the estimated/expected lifetime of 15-20 years or more.

SUMMARY

In a first aspect, the present disclosure relates to method of manufacturing vacuum insulating glass (VIG) units, where the method may comprise the steps of:
  providing a plurality of glass panes;
  obtaining individual topographic representations of different support areas of each glass pane of the plurality of glass panes based on input from a measuring arrangement;
  estimating surface distance characteristics between different combinations of the plurality of glass panes based on the topographic representations;
  storing one or more of the surface distance characteristics;
  selecting a first glass pane and a second glass pane of the plurality of glass panes based on the surface distance characteristics; and
  identifying a first pillar type to be placed at predefined support areas within a gap between the first glass pane and the second glass pane.

The first glass pane and second glass pane and pillars of the first pillar type are hence used for manufacturing vacuum insulating glass (VIG) units having an evacuated and sealed gap between the glass sheets, and pillars of the first type are placed in said gap.

It is generally understood that the glass panes may be tempered glass panes such as thermally tempered glass panes.

In aspects of the first aspect, the method may comprise associating pane identification information with the stored surface characteristics for different support areas of at least a portion of the plurality of glass panes.

In aspects of the first aspect, the method may further comprise: selecting one or more manufacturing layouts based on the stored surface distance characteristic.

It is generally understood that a processing arrangement in aspects of the present disclosure may retrieve information from estimated surface distance characteristics from a data storage DS in which they are stored. This information may be processed by the processing arrangement together with support pillar information retrieved from a data storage, and based thereon manufacturing layouts may be established.

The processing arrangement may comprise one or more hardware processors and corresponding circuitry configured to process data from one or more data storages in accordance with software program code.

Each stored, estimated surface distance characteristic may in aspects of the present disclosure comprise or be associated with pane identification information for use when subsequently providing a VIG unit assembly for a VIG unit based on a stored surface distance characteristic.

The manufacturing layouts may in aspects of the present disclosure comprise support pillar type information for enabling a data processor to identify which pillar type should be used at various or different predefined support areas of at least one of the first and second glass panes based on the surface distance characteristics. The support pillar type information may thus comprise information enabling a system receiving or retrieving a manufacturing layout to identify the support area location and which pillar type to be used at this support area.

In aspects of the first aspect, the first pillar type may be based on the one or more manufacturing layouts.

In aspects of the first aspect, the first pillar type may be based on based on pillar representation data and the stored surface distance characteristic.

Advantageously, in aspects of the first aspect, the first pillar type may be selected based on at least one of pillar height, pillar material, pillar hardness, pillar density, and pillar shape.

In preferred aspects of the first aspect, the method may further comprise distributing support pillars of the first pillar type at the predefined support areas according to the one or more manufacturing layouts.

In preferred aspects of the first aspect, the method may comprise identifying a second pillar type to be placed at different predefined support areas of at least one of the first glass pane and the second glass pane. In advantageous aspects of the first aspect, the second pillar type may be based on at least one of the one or more manufacturing layouts, pillar representation data, and the stored surface distance characteristic.

In preferred aspects of the first aspect, the method may comprise distributing support pillars of the second pillar type at the different predefined support areas according to the one or more manufacturing layouts.

Advantageously, in aspects, the second pillar type may be selected based on at least one of pillar height, pillar material, pillar hardness, pillar density, and pillar shape.

One or more of the pillar height, pillar material, pillar hardness, pillar density, and/or pillar shape of the selected second pillar type may in aspects of the present disclosure be different from one or more of the pillar height, pillar material, pillar hardness, pillar density, and/or pillar shape of the selected first pillar type.

Identifying the first pillar type and e.g. also a second pillar type to be placed at predefined support areas within a gap between the first glass pane and the second glass pane may be provided based on the estimated surface distance characteristics, e.g they may be identifiable by means of a manufacturing layout related to and/or determined based on stored surface distance characteristic.

In aspects of the first aspect, the method may preferably comprise that the support pillars of at least one of the first type and the second type have different properties. These different properties may e.g. comprise one or more different pillar height, pillar material, pillar hardness, pillar density, and/or pillar shape of the selected first pillar type.

In aspects of the first aspect, the method may preferably comprise that the support pillars of at least one of the first type and the second type have different heights.

By providing that the selected first and second pillar types have different heights, this may help to provide an individual adaption to the surface topography at the different support areas of the VIG unit pane or panes where the support pillars are placed by e.g. one or more pillar placement arrangements of a support pillar distribution station. This may e.g. help to reduce the risk of damages over time at the support areas.

Said pane elements may in aspects of the present disclosure be made from thermally tempered glass.

Thermally tempered glass panes may comprise different surface variations caused by e.g. the manufacturing of the thermally tempered panes. Accordingly, especially if utilizing thermally tempered glass panes for the VIG units, it may be advantageous to provide different adaptions such as utilizing different pillar height and/or other varying pillar characteristics as mentioned above, adapt pane orientations, provide pane selections based on estimated surface distance characteristics and/or the like to obtain VIG units with advantageous properties such reducing stress at the VIG panes, it may reduce the number of scratches over time provided by support pillars due to shear forces. It may help to reduce the risk of support pillars falling towards the bottom of a gap between the panes or displacing between panes, and/or the like.

In aspects of the first aspect, the method may comprise orienting the first glass pane and the second glass pane relative to each other towards a preferred orientation based on the surface distance characteristics and the one or more manufacturing layouts.

In aspects of the first aspect, the method may comprise storing the preferred orientation of the first glass pane and the second glass pane relative to each other.

In advantageous aspects of the first aspect, the method may comprise that the measurement arrangement provides input of surface variation of the plurality of glass panes at the predefined support areas.

In aspects of the first aspect, the method may comprise estimating a height of at least a portion of each glass pane at the predefined support areas based on said input from the measuring arrangement.

In aspects of the first aspect, the comprise storing of one or more of the surface distance characteristics comprises storing surface distance characteristics that are within a predetermined tolerance band in a data storage.

In aspects of the first aspect, said first and second glass panes are arranged and aligned opposite to each other with said support pillars placed between the first and second glass panes, such as wherein pillars of the second type is also placed between the first and second glass panes.

It is generally understood that in one or more aspects of the present disclosure, the first pillar type and e.g. also the second pillar type may be selected between a plurality of different predefined pillar types.

In aspects of the first aspect, an edge sealing, is provided for sealing said gap between said first and/or second glass pane.

In aspects of the first aspect, said edge seal is a solder material such as glass frit solder material, and wherein said edge seal is heated and subsequently cooled so as to provide an airtight edge-seal.

The edge seal may e.g. also be provided by a metal solder material or a clamping solution in aspects of the present disclosure.

In aspects of the first aspect, said gap between said first and second glass panes is evacuated and subsequently sealed so as to maintain the gap evacuated.

In a second aspect, the present disclosure relates to a system for providing manufacturing layouts for vacuum insulating glass (VIG) units. The system may comprise:
 a measuring arrangement provided as part of a measuring station, the measuring arrangement comprising one or more surface variation determination sensors arranged to measure surface variations of a surface of pane elements at predefined support areas;
 a data processing arrangement arranged to receive input from one or more surface variation determination sensors, and process said input to establish individual topographic representations of the respective pane element and estimate surface distance characteristics between different combinations of the pane elements based on the topographic representations; and
 a data storage arranged to store the surface distance characteristics, the data processing arrangement being arranged to determine one or more manufacturing layouts based on the surface distance characteristics.

In aspects of the second aspect, the surface variation determination sensors may be configured to measure surface variations of tempered glass panes such as thermally tempered glass panes.

In aspects of the second aspect, the one or more surface variation determination sensors are distributed across a measuring area, preferably in one or more substantially linear rows, wherein a mutual distance between adjacent sensors in one or more rows is between 20 mm and 600 mm.

In aspects of the second aspect, the one or more manufacturing layouts may include support pillar type information for predefined support areas and pane orientation information for respective panes to be assembled to provide a vacuum insulating glass assembly for a vacuum insulated glass unit.

In aspects of the second aspect, the data processing arrangement may be arranged to select pane elements to be paired for a vacuum insulated glass assembly based on the surface distance characteristics and one or more pane identifiers associated with the manufacturing layouts.

In advantageous aspects of the second aspect, the system may further comprise:
- a pane pairing station for arranging and aligning pane elements to be paired;
- a support pillar distribution station having a support pillar placement arrangement arranged to distribute support pillars at the predefined support areas of paired pane elements based on the one or more manufacturing layouts;
- an edge sealing distribution station configured to provide an edge sealing to the paired pane elements of a VIG assembly; and
- a VIG heating and gap evacuation station.

In one or more aspects of the present disclosure, the system of any of claims 21-25 may be configured to provide, or operate according to, the method of any of claims 1-20.

BRIEF DESCRIPTION OF THE DRAWINGS

Aspects of the present disclosure will be described in the following with reference to the figures in which:

FIG. 8: Illustrates an example, of surface variations according to embodiments of the present disclosure, FIG. 9: illustrates an example of testing whether a surface distance characteristic may be considered ok according to embodiments of the present disclosure.

DETAILED DESCRIPTION

Referring now to the figures, where the present disclosure will be described with reference to specific embodiments, without limiting the same, it is to be understood that the disclosed embodiments are merely illustrative of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
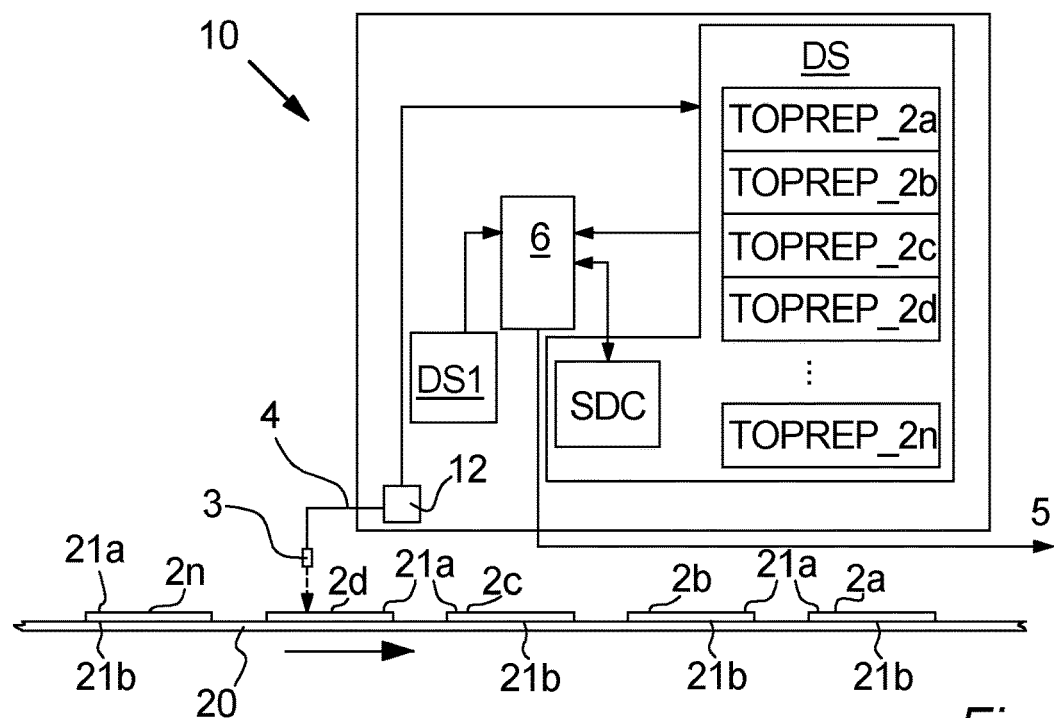
FIG. 1: Illustrates embodiments of the present disclosure where individual topographic representations are determined.

FIG. 1 schematically illustrates embodiments according to the present disclosure where individual topographic representations TOPREP_2a-TOPREP_2n of a plurality of pane elements 2a-2n are determined and stored in a data storage DS based on measurement data 4 from a measuring arrangement 3 provided in a measuring step.

A plurality of pane elements 2a-2n are provided on a pane transportation arrangement 20 such as a conveyer arrangement, a conveyer belt or the like driven by a conveyer drive such as an electric motor (not illustrated). In the present embodiment of the present disclosure, the pane elements 2a-2n are arranged to lie substantially horizontally on one of their opposing pane surfaces 2a, 2b to support on the conveyer arrangement.

In embodiments of the present disclosure, the measuring arrangement is an optical measuring arrangement comprising one or more optical sensors and one or more light sources. Different embodiments of the measuring arrangement are described in more details later on.

The measuring arrangement 3 is arranged to determine surface characteristics or surface variations of the upwardly facing surface(s) 21a of the panes 2a-2n at a plurality of predetermined support areas (SPAR1-SPARn) and provide a measurement data 4 based thereon. This measurement data 4 may in various embodiments of the present disclosure be processed by a data processor (not illustrated) in order to determine individual topographic representations TOPREP_2a-TOPREP_2n of each of the pane elements 2a-2n based on the measurement data 4 from the measuring arrangement 3, and these topographic representations TOPREP_2a-TOPREP_2n are stored 18 in a data storage DS.

The topographic representations may include image representations or profile representations of the surface topography.

The measuring arrangement 3 may be an optical measurement arrangement that includes a plurality of surface variation determination sensors 3_1-3_n that are arranged to determine at least a part of the respective pane element 2a-2n surface topography at least at different, predefined locations SPAR1-SPARn of the surface 21b of said plurality of panes. The surface variation determination sensor of the measuring arrangement 3 may be kept in a substantially fixed position relative to the glass panes while providing the measurements. The surface variation determination sensor may provide a faster determination of topography representation and increase manufacturing speed.

The measuring arrangement 3 may in a non-contacting arrangement such that measuring arrangement includes optical sensors 3a-3n and one or more light sources, and/or one or more image sensors.

The one or more light sources transmits light towards the respective pane surface, and the optical sensor(s) detects the reflected light from said pane surface and converts the detected, reflected light into an electronic signal which may be digitized by an analog to digital converter.

The image sensor may include a charge coupled device (CCD) sensor.

In other aspects of the present disclosure, the measurement arrangement 3 may include a mechanical measuring arrangement comprising at least one mechanical sensor arranged to have one or more components touching said surfaces and provide input based on the topography variations so as to obtain said individual topographic representations.

The measuring arrangement 3 providing the measurement data 4 may help reduce data processing to subsequently determine support areas, as the retrieved data from the measuring arrangement 3 already represents data from a predetermined support area.

In aspects of the present disclosure, the measurement arrangement 3 may provide input of the surface variation of the upwardly facing surface(s) 21a of the panes 2a-2n at no more than 97% or no more than 80% or no more than 60% of a plurality of predetermined support areas. The surface variation at the remaining support areas may be estimated by interpolation or other suitable estimation method. In further embodiments of the present disclosure, the measurement arrangement 3 may provide measurement data 4 of the surface variation at substantially all of the predetermined support areas.

A plurality of the stored topographic representations TOPREP_2a-TOPREP_2n are then processed by means of a data processing arrangement 6 to estimate a resulting surface distance characteristic SDC between pairs of panes 2a-2n based on the respective processed topographic representations TOPREP_2a-TOPREP_2n.

The surface distance characteristic SDC may be a linear or perpendicular distance that represents a distance variation between opposing or spaced apart surfaces 21a, 21b, etc. at a location SPARn, SPARn+1 between which a support pillar 9 may extend to space apart or maintain the gap 8 between a proposed combination of glass panes 2a-2n that may ultimately form a VIG unit.

The processing of a plurality of the stored topographic representations TOPREP_2a-TOPREP_2n by the data processing arrangement 6 comprises processing data HI_1-HI_n relating to similar, opposite predefined support areas SPAR1-SPARn of two of said plurality of panes 2a-2n. The similar, opposite predefined support areas relates to support areas which, if the panes represented by the respective, topographic representations were physically paired and separated by support pillars, these similar predefined support areas would be arranged opposite to each other and a support pillar would extend between these areas. This may help to provide a more precise surface distance characteristic and/or reduce the needed processing to obtain a surface distance characteristic.

The processing of the plurality of the stored topographic representations TOPREP_2a-TOPREP_2n by means of the data processing arrangement 6 comprises estimating a plurality of resulting surface distance characteristics SDC for a plurality of pairs or combinations of pane elements, and storing said plurality of resulting surface distance characteristics in data storage, DS.

The processing of a plurality of the stored topographic representations (TOPREP_2a-TOPREP_2n) by the data processing arrangement 6 comprises a levelling step that is provided by the processing arrangement in order to level the topographic representations.

Generally, it is understood that the data processor arrangement 6 may comprise one or more hardware processors and corresponding circuitry configured to process data from one or more data storages DS in accordance with software program code stored in a data storage DS1 and provide and preferably store the results of the processing.

In embodiments of the present disclosure, a first data processor 12 may be configured to process the "raw" measurement data 4 from the measurement arrangement 3, in order to provide and store topographic representations TOPREP_2a-TOPREP_2n in the desired data format(s). A second data processor 6 may thus be provided in order to process the stored topographic representations TOPREP_2a-TOPREP_2n. However, in other embodiments of the present disclosure (not illustrated in FIG. 1) the data processor arrangement 12 and 6 may be provided by the same hardware processor.

It is to be understood that the processing arrangement 6 and/or 12 in embodiments of the present disclosure may comprise any suitable type of hardware processor or combination of hardware processors such as one or more central processing units, microprocessors and/or the like, and corresponding circuitry, enabling the processing of the measurement data 4 and/or data in data storage(s) DS, and the like, in accordance with the various embodiments of the present disclosure as described in this document.

Vacuum insulating glass VIG assemblies may thus be provided based on the above, as described in more details later on, where each VIG assembly comprises
- at least a first and a second glass pane 2a-2n
- a plurality of support pillars 9 distributed in a gap between opposing surfaces the said glass panes to provide a gap 8 between the panes,
- an edge sealing such as edge solder, glass frit or another type of edge sealing may be provided around and near the edges of the panes, This assembly may then be further processed to provide VIG units by evacuation of the gap 8, and the VIG assembly may e.g. be heated to melt/soften the edge solder (if the edge sealing comprises edge solder) and then hardened (by cooling) to provide an airtight edge sealing. An evacuation opening solder such as glass frit arranged to cover an evacuation opening in one of the panes (if present) may also be heated to provide a sealing of the evacuation opening and hence seal the evacuated gap.

The vacuum insulating glass (VIG) assemblies may be understood as assemblies each comprising first and a second glass pane and the plurality of support pillars distributed between opposing surfaces of said glass panes to maintain a gap between the glass panes. It is generally understood that the vacuum insulating glass (VIG) assemblies may also include the edge seal in aspects of the present disclosure. The vacuum insulating glass (VIG) assemblies may hence be ready for heating the edge seal (if necessary) and/or evacuation of the gap, and the subsequent sealing of the gap between the first and second panes after the evacuation.

Figure 2:
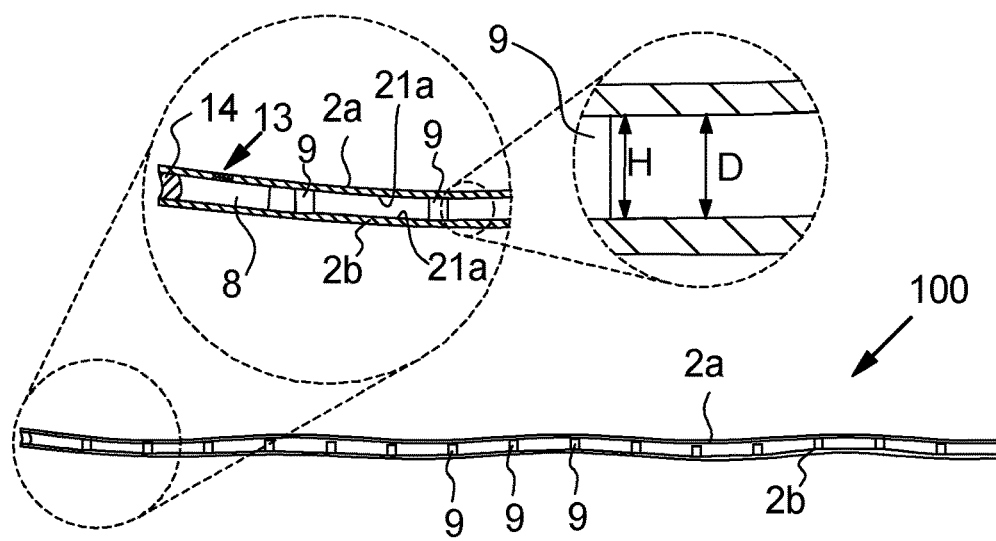
FIG. 2: Illustrates a VIG unit according to embodiments of the present disclosure.
Figure 3:
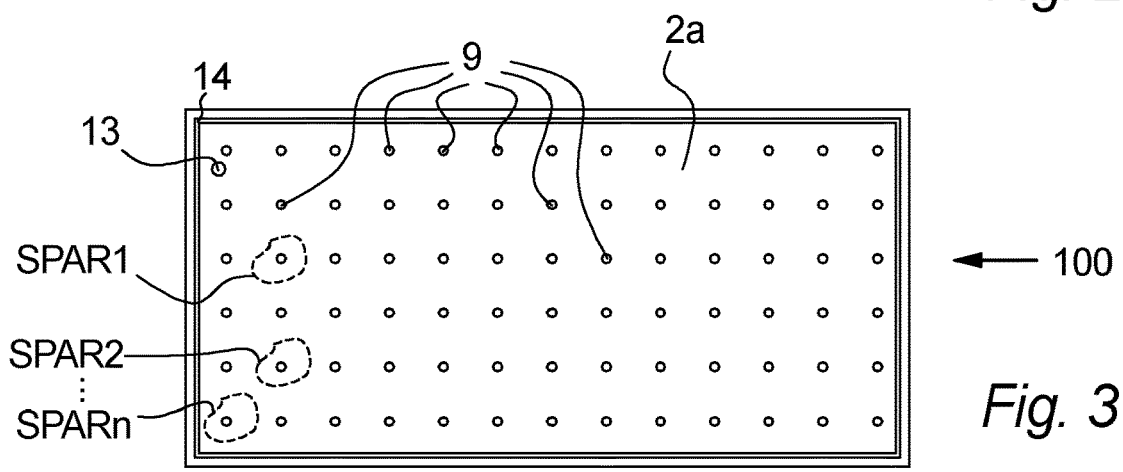
FIG. 3: Illustrates an embodiment of a VIG unit according to embodiments of the present disclosure see.

FIG. 2 illustrates a cross sectional view of a VIG unit according to embodiments of the present disclosure. The VIG unit comprises a first glass pane 2a and a second glass pane 2b or 2c arranged parallel to the first pane 2a. These panes 2a, 2b are arranged with a distance D to provide the gap 8 between the panes, and this distance is measured between the surface 21a of the panes 2a, 2b facing the gap 8. The pillars are distributed in the gap 8 between the panes, preferably evenly distributed in rows and columns as illustrated in FIG. 3, and have a height H extending between the surfaces 21b. The distance D is provided by the support pillars 9. The gap 8 is evacuated to have a reduced pressure compared to the ambient pressure outside the VIG, and has thus been evacuated through an evacuation opening 13, which has subsequently been sealed by an evacuation opening sealing 15 such as a solder material, preferably glass frit or the like.

In preferred embodiments of the present disclosure, the pressure in the gap, after evacuation, is preferably below 0.002 mbar, such as below 0.001 mbar. For example, the pressure in the evacuated gap may be below 0.001 mbar, such as below 0.0005 mbar or below 0.0001 mbar.

Generally, in preferred embodiments of the present disclosure, the distance D between the panes of a VIG is between 1 and 5 mm, preferably between 1.5 mm and 2.5 mm, about 2 mm.

The VIG unit 100 comprises an edge sealing 14 around the edges of the panes 2a, 2b, in this case between the panes 2a, 2b, which encloses the gap 8 so that the gap is enclosed by the panes 2a, 2b and the edge sealing 14. The edge sealing 14 may comprise a solder material such as a glass frit material which has been provided at one of the panes before the panes have been "physically paired", and when subsequently physically pairing the panes 2a, 2b, the edge frit material extend between the panes.

In embodiments of the invention where the evacuation opening sealing 15 and/or the edge sealing 14 comprises solder material such as glass frit, this solder material is heated so as to melt the solder material (e.g. by melting if the solder material is glass frit material) and/or to evaporate solvent and/or binder material in the solder. The material 14 is then cooled to harden the solder material and hence provides an air-tight edge sealing the gap 8 when it is cooled.

The panes 2a, 2b to be paired are generally, in preferred embodiments of the present disclosure, made from thermally tempered glass, but may in other embodiments of the present disclosure be made from glass which is not thermally tempered. The glass panes are transparent to light and one or both of the panes may comprise one or more coatings such as low-e coatings or the like.

Thermally tempered glass panes may include different surface variations caused by the manufacturing of the thermally tempered panes. Accordingly, especially if utilizing thermally tempered glass panes for the VIG units, it may be advantageous to provide different adaptions such as utilizing different pillar heights, pillar materials, pillar hardness, pillar shapes, adapt pane orientations, provide pane selections based on estimated surface distance characteristics and/or the like to obtain VIG units with advantageous properties as described in this document.

FIG. 3 illustrates an embodiment of a VIG unit 100 according to embodiments of the present disclosure, seen from above through the panes 2a, where the plurality of support pillars 9 are visible. The support pillars 9 are distributed evenly in straight, parallel support pillar rows, and preferably so that each support pillar is moreover also included in parallel, straight support pillar columns arranged perpendicular to the rows. This is done in order to provide that when the pressure is reduced in the gap 8 by a vacuum pump, and the gap 8 is subsequently sealed by edge sealing, the vacuum brings the opposing panes towards each other, and in order to obtain that the panes are kept separated by the gap, to obtain a good insulation/U-value of the VIG unit, the support pillars are provided.

The support pillars 9 support the panes at different support areas SPAR1-SPARn (not all are shown in the figure) to maintain the gap 8 when the pressure is reduced in the gap 8 through the evacuation opening 13. The edge sealing is in this embodiment provided between the panes near the edges of the pane as described above.

Figure 4:
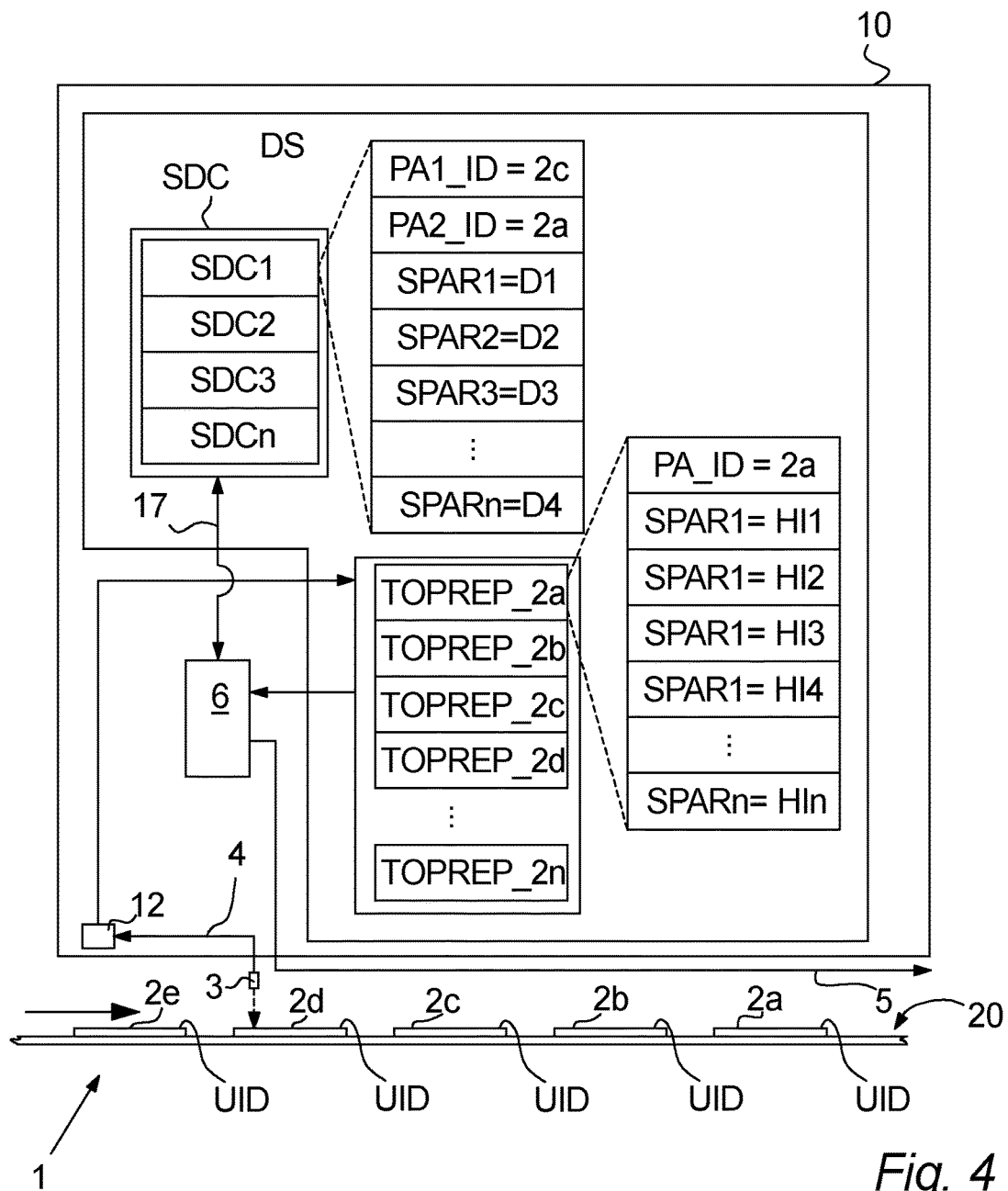
FIG. 4: Illustrates an embodiment of the present disclosure where a data processing arrangement receives measurement data from a measuring arrangement

FIG. 4 schematically illustrates an embodiment of the present disclosure where a data processing arrangement 12, as described above, receives measurement data 4 from a measuring arrangement 3 arranged to determine surface variations or surface height variations of the panes 2a-2n, and stores this data in a data storage as a topographic representation TOPREP_2a-TOPREP_2n of a surface of a respective pane element 2a-2n.

Glass panes used for VIG units may not have completely flat surfaces, but the relative surface heights may vary across the length and/or width of the panes 2a-2n due to "roller waves" caused by supporting rollers which supports the pane during manufacturing of the pane, due to "edge lift" causing the pane to deflect between two opposite edges of the pane, thereby causing a parabola or hyperbola shape and/or the like. Such surface unevenness may present manufacturing issues for non-vacuum insulated glass pane units.

As the pane surfaces of the glass panes are not completely straight or flat, as a vacuum pressure is applied in the gap 8 between the panes of the VIG unit, unwanted stresses proximate the locations of the support pillars as the panes surfaces are sucked towards the support pillars and each other when the vacuum is applied. For example, at locations where the support pillars are too small compared to the distance between the panes at the area where the support pillar is placed, may result in forces being distributed across a smaller amount of pillars, increasing a pressure distribution on the surrounding pillars. Insufficiently sized support pillars may fall to the bottom of the pane in the gap between the panes if the VIG is subjected to external forces such as objects hitting the pane, a wind gust, a smaller reduction of the vacuum in the pane and/or the like, and this may at least provide unwanted aesthetic drawbacks.

Additionally, if a support pillar is too tall or its height is greater than the gap between the glass panes at positions/areas where the support pillar is to be placed, the support pillar may provide an increased, unwanted stress condition of the panes at that area.

Each topographic representation TOPREP_2a-TOPREP_2n comprises information of the surface variation of the pane surface of a specific pane, proximate support areas SPAR1-SPARn, where a support pillar should be placed.

Accordingly, for example the topographic representation relating to pane 2a comprises topography information for the support area SPAR1, in the form of a height HI1 compared to a determined reference height, reference plane or reference line, topography information for the support area SPAR2, in the form of a height HI2 compared to the same determined reference height, reference plane or reference line and so on, as described in more details later on.

The topographic representations may thus, comprise image representations or profile representations of the surface topography of a pane 2a-2n.

In preferred embodiments of the present disclosure, each of the plurality of stored topographic representations TOPREP_2a-TOPREP_2n and/or the stored surface characteristics SDC1-SDCn are assigned an identifier such as a unique identification PA_ID. Generally, this unique identification PA_ID may be retrieved from or based on a unique identifier UID of the pane 2a-2n on which the respective topographic representation is based. This unique identifier UID on the panes may be a QR code, barcode, a tag such as a RFID tag or the like, and this information is preferably retrieved from the respective pane by a scanning arrangement (not illustrated) configured to scan/determine the unique identifier, when determining the topography of the pane surface, and is stored in a data storage together with the determined topography representation. This scanning arrangement may be arranged together or near the measuring arrangement 3, or the measuring arrangement 3 may be configured determine the unique pane identification UID.

The unique pane identification UID provides an advantageous traceability and handling of the panes and also the topographic representations. By assigning the topographic representations a Unique Identification according to or based on the unique identification on the respective pane, this may moreover provide logistical advantages later on when providing a VIG unit. For example, a subsequent manufacturing section/device for providing pillars, handling the panes or the like may be adapted to scan the ID of the pane(s) and thus provide the desired/determined actions based on the correct/intended estimated resulting surface distance characteristics.

The UID scanning may be provided by an image sensor such as a CCD sensor (not illustrated)

In embodiments of the present disclosure, the location/position of said unique identifier UID at the respective pane is determined and utilized as a reference for subsequent processing to determine pane orientation PA_OR and/or support area SPAR1-SPARn positions.

In embodiments of the present disclosure, the topographic information may comprise data relating to the time and/or date of the establishment of the respective, individual topographic representation, and/or other "meta data" such as shape (rectangular, square) and/or size (length of side edges of the respective pane) $2a$-$2n$ related to the respective, individual topographic representation TOPREP_$2a$-TOPREP_$2n$ and/or data relating to the time and/or date of the respective, individual topographic representation. Such information may also in embodiments of the present disclosure be provided in a manufacturing layout.

It is understood that in embodiments of the present disclosure, if the processor arrangement 12 (and/or 6) determines that a topographic representation varies to an extent where the pane would be disadvantageous to use, such a topographic representation may be omitted and not stored in, or alternatively erased from, the data storage so that it is omitted from being a part of processing to estimated surface distance characteristics SDC1-SDCn based on that pane. The system 10 may thus provide an output (not illustrated) to a human operator or a sorting arrangement, identifying the pane to assure the pane is removed from the manufacturing line, is provided to have the surface variation determined again for the sake of good order before discarding the pane and/or the like.

In embodiments of the present disclosure a topography representation of a specific pane may be represented in a plurality of different surface distance characteristics SDC with topography representations of different other panes, to provide an optimized paring of the panes. This may provide more freedom in combinations of panes and/or support pillar to provide an improved, VIG unit.

The data processor arrangement 6 processes the topographic representations TOPREP_$2a$-TOPREP_$2n$ to estimate surface distance characteristics SDC1-SDCn between different combinations of the plurality of glass panes ($2a$-$2n$) based on the topographic representations (TOPREP_$2a$-TOPREP_$2n$) as described in more details later on and stores 17 the estimated surface distance characteristics SDC1-SDCn in a data storage DS.

In embodiments of the present disclosure, only surface distance characteristics SDC1-SDCn that are within a predetermined threshold may be stored in the data storage.

It is understood that in embodiments of the present disclosure, the processing arrangement 6 may discard some estimated surface distance characteristics SDC1-SDCn before storing them. For example, if it is determined that an estimated surface distance characteristic for one reason or another is considered as not relevant. For example, if it is determined that the estimated distance variation between two panes is not within a predetermined threshold or predetermined tolerance band such that estimated distance variations are considered too high, too low, or varying, if the distance variations exceeds an upper or lower predefined threshold, this estimated surface distance characteristics may be discarded without saving/storing.

In at least one embodiment, a plurality of the estimated, resulting surface distance characteristics, SDC, may be based on individual topographic representations obtained from the same pane. A topographic representation of a first pane may be compared to a second pane and a third pane, respectively, to see which topographic representation of these panes provides the best fit to the topographic representations of the first pane. The processing arrangement may try out different pane combinations based on the topography representations in order to provide a VIG assembly where the estimated, resulting surface distance characteristic, SDC, is optimized to reduce distance variations between the panes, to fit the pillar height, pillar material, pillar hardness, or pillar shape, to ensure that the distance, D, does not exceed an upper threshold and/or falls below a lower threshold and/or the like.

In embodiments of the present disclosure, a plurality of the panes $2a$-$2n$ suitable to be paired may have substantially similar shape and size, and this information may be provided in a topography representation, SDC or the like in order to determine which panes to be physically paired subsequently during manufacturing of a VIG. For example, the data processor arrangement 6 may in embodiments of the present disclosure be configured to select panes for which a surface distance characteristic should be estimated, based on shape and/or size information.

Each stored, estimated surface distance characteristic SDC1-SDCn preferably at least comprises or is associated with pane identification information PAn_ID (PA1_ID, PA2_ID), and information of estimated surface distance characteristics SDC1-SDCn for different support areas SPAR1-SPARn of at least a portion of the plurality of glass panes.

The pane identification information PA1_ID, PA2_ID provides the possibility of later on determining which panes the respective, estimated surface distance characteristic SDC1-SDCn relates to. This information may be retrieved from pane identification information PA_ID of the respective, topographic representation TOPREP_$2a$-TOPREP_$2n$, or from another part of a data storage DS containing other pane related information (not illustrated).

The Information of estimated surface distance characteristic SDC1-SDCn for different support areas SPAR1-SPARn of the panes may comprise an estimated distance D1-Dn between the respective support areas SPAR1-SPARn of opposing and/or spaced apart panes that may comprise the VIG unit. The distance between the support area SPARn of a first glass pane ($2n$) and the support area SPARn+1 of a second glass pane ($2n$+1) that may be spaced apart from and may be proximately aligned with the support area SPARn of the first glass pane ($2n$) is Dn. For example, the distance between the support area SPAR1 and the support area SPAR2 is D1, the distance between a subsequent support area SPAR3 of the first glass pane or a subsequent glass pane and a subsequent support area SPAR4 of the second glass pane or another subsequent glass pane that may be spaced apart from and may be proximately aligned with the subsequent support area SPAR4 of the first glass pane is D2. This may be determined in different ways as described in more details later on in relation to suitable methods of measuring the surface variations and/or establishing topographic representations TOPREP.

In embodiments of the present disclosure, the distance D1-Dn may be represented by the estimated resulting surface variation at a support area (SPAR1-SPARn) and thereto added a "distance offset" which is the distance that provides the gap between the panes due to the support pillar. For example, a distance D1 may be determined to be 0.2 mm due to the surface variations of the panes, and thereto added 0.2 mm to provide the desired distance between the panes by the pillar, i.e. the estimated distance D1 between the panes may be 0.4 mm. In other embodiments of the present disclosure the distance D1-Dn may be represented as the estimated surface variation of the panes alone, and the distance offset may thus be added later on, if the panes may be used for VIG units having different desired gap distances between the panes such as between 0.1 and 1 mm, between 0.2 and 0.4 mm, however, preferably about 0.2 mm.

Figure 4A:
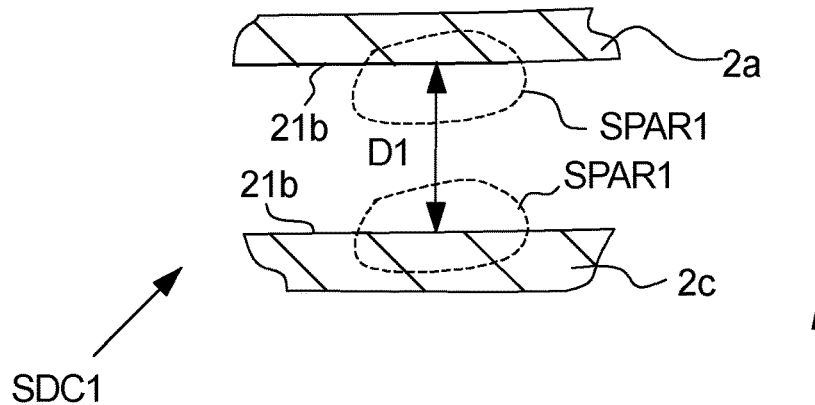
FIG. 4a: Illustrates an embodiment of the present disclosure regarding an example of information/data of an estimated surface distance characteristic

FIG. 4a illustrates an example according to embodiments of the present disclosure regarding what the information of an estimated surface distance characteristic SDC may comprise, in this example illustrated based on SDC1 illustrated in FIG. 4.

The system 1 may then provide an output data 5 based on one or more manufacturing layouts (MAL1-MALn) and/or the estimated surface distance characteristics SDC1-SDCn to enable manufacturing of VIG units which is based on the estimated surface distance characteristics SDC1-SDCn and thus based on the topographic characteristic TOPREP_2a-TOPREP_2n of surfaces 21b of panes 2a-2n of the VIG unit.

The output data 5 may provide a notification as to a preferred or appropriate combination of a first glass pane (2a) and a second glass pane (2c) or a selection of the first glass pane (2a) and the second glass pane (2c) that may be combined to form a VIG assembly.

Generally, it is understood that the output(s) 5 may be transmitted, retrieved and/or the like in any suitable way by suitable data processing arrangements.

Figure 5:
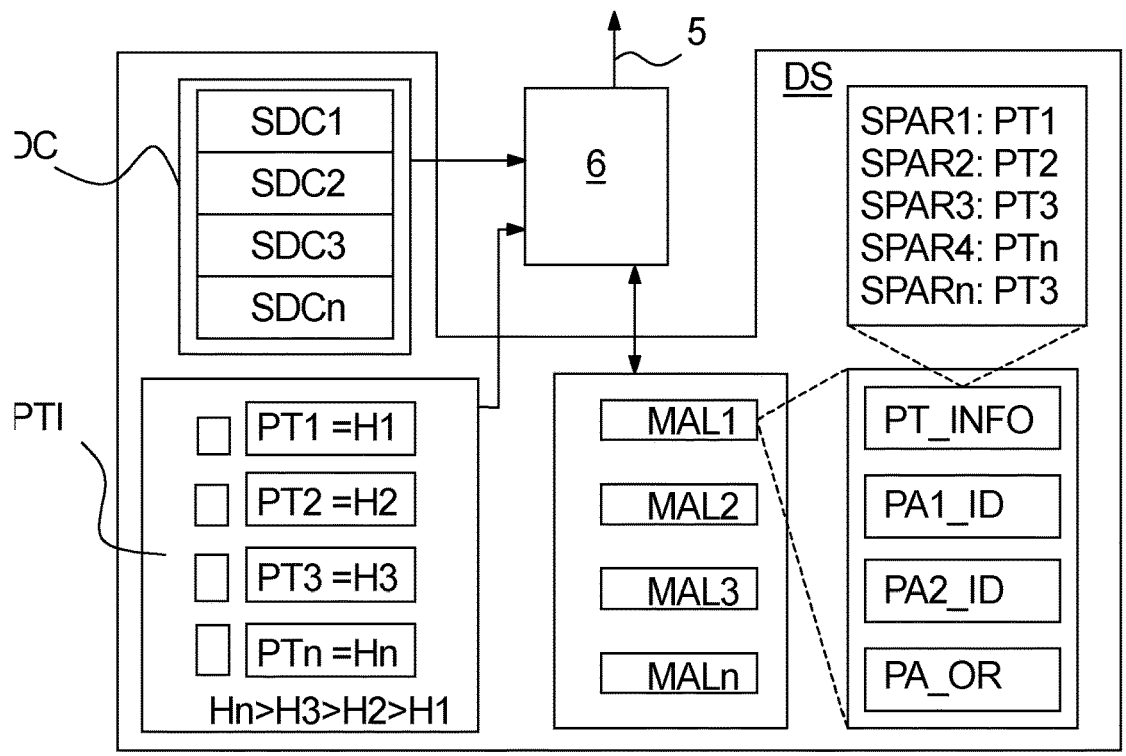
FIGS. 5-5b: Illustrates embodiments of the present disclosure wherein manufacturing layouts are determined

FIG. 5 illustrates embodiments of the present disclosure wherein manufacturing layouts MAL1-MALn are determined or selected by the processing arrangement 6 based on estimated, stored surface distance characteristics SDC1-SDCn.

The processing arrangement 6 retrieves information from an estimated surface distance characteristics SDC1-SDCn from the data storage DS. This information is processed together with support pillar information PTI retrieved from a data storage, and based thereon manufacturing layouts are established.

The manufacturing layouts MAL1-MALn may comprise support pillar type information PT_INFO identifying which pillar should be used at various or different predefined support areas SPAR1-SPARn of at least one of a selected glass pane (2a-2n) based on the surface distance characteristics SDC1-SDC). The support pillar type information PT_INFO may thus comprise information enabling a system receiving a manufacturing layout to identify the support area location and which pillar type to be used at this support area.

The support pillar type information PT_INFO may also in embodiments of the present disclosure alone comprise a list of pillar representation data of pillar types PT1-PTn in a predefined order, and thus, by selecting a specific number in a list, this may also identify the pillar type. For example, line 25 in the list may be known to relate to a specific support area having coordinates x, y (relating to pillar row and column information respectively).

The manufacturing layouts MAL1-MALn may moreover, in embodiments of the present disclosure, comprise orientation information PA_OR representing a mutual or preferred orientation of the first and/or second glass panes, relative to the other of the first and/or second glass pane. The preferred orientation of the first glass pane and the second glass pane relative to each other may be based on the surface distance characteristics SDC1-SDCn and the one or more manufacturing layouts MAL1-MALn may be stored by the DS. This orientation information PA_OR may comprise information of which pane surface of a first pane PA1_ID to face another pane surface of the other pane PA2_ID of the vacuum insulating glass assembly, and/or which pane edges to be arranged at the same side of the vacuum insulating glass assembly.

The processing arrangement 6, 12 may process the topography representations and/or the estimated surface distance characteristics, and based on this, the processing arrangement 6, 12 may determine that two panes will fit better with respect to the mutual surface variations, if the orientation of one of the panes is changed with respect to the other pane, as this may help to get the surface variations at support areas to fit predefined pillar heights and/or the like.

In preferred aspects of the present disclosure, said orientation information may comprise information of which pane surface to face another pane surface of the other pane of the vacuum insulating glass assembly, and/or which pane edges to be arranged at the same side of the vacuum insulating glass assembly.

The support pillar type information PTI comprises information of different support pillar types, pillar height, pillar width, pillar material, pillar hardness, pillar density, pillar shape and possibly also other characteristics of different types of predefined pillars. For example, the data storage may comprise information of between 2 and 50 different pillar types, such as between 4 and 15 different pillar types. In the present example, the support pillar information PTI comprises information of four different pillar types PT1-PTn. Pillar type PT1 has a height of H1, Pillar type PT2 has a height of H2, Pillar type PT3 has a height of H3, and Pillar type PTn has a height of Hn, in the present example, Hn>H3>H2>H1.

As can be seen, the different support SPAR1-SPARn in the manufacturing layout MAL1 may be assigned different pillar types PT1-PTn, and thus different pillar heights H1-Hn dependent on the area. In some embodiments, the different pillar types PT1-PTn may be selected based on pillar heights, pillar material, pillar hardness, pillar shape or the like, enabling an individualized manufacturing of VIG units with respect to the different available pillar type placed at desired support areas of the panes.

Figure 5A:
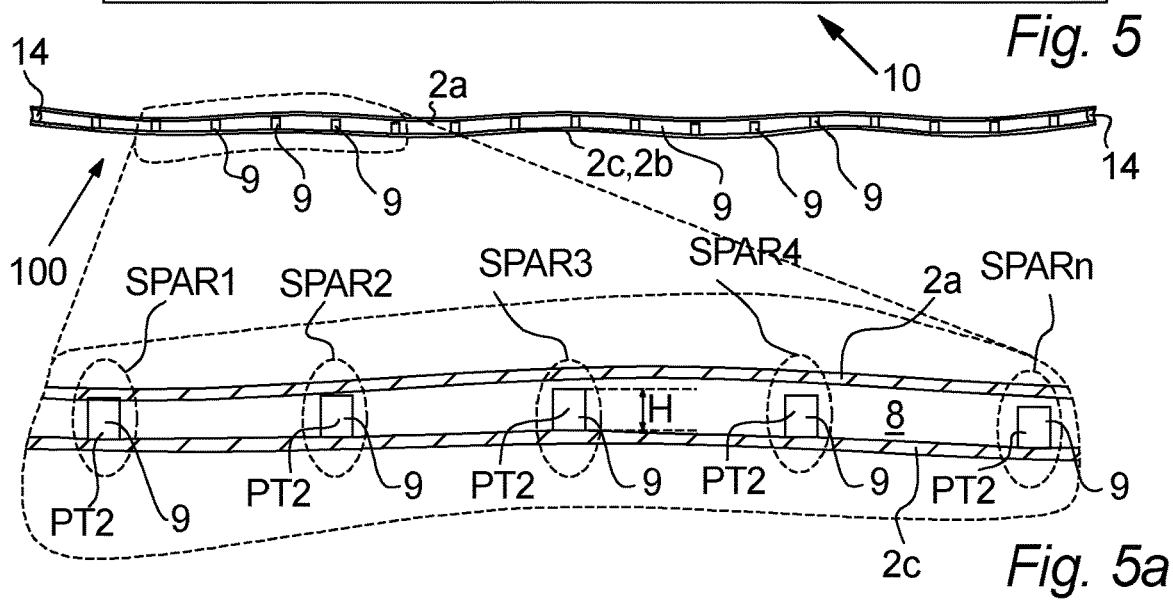

FIG. 5a illustrates a cross sectional view of a VIG unit 100 where all support pillars 9 are determined to be of the same pillar type and thus have the same height H. as can be seen from the FIG. 5a, this situation provides, due to the surface variations between the panes, that the height H of some of the pillars are OK or acceptable, while some of the pillars, at support area SPAR3 have an insufficient height as the distance between the panes at this area SPAR3 is larger than the height H of the pillar. In other situations, as at SPAR1, the height of the pillar may be too large for the area SPAR1.

Accordingly, as the same pillar height (i.e. height H2) is not adequate for all the support areas SPAR1-SPARn, the processing arrangement 6 may thus, based on the surface distance characteristic SDC1-SDCn provide a manufacturing layout MAL1 as illustrated in FIG. 5, suggesting different pillar types for the different support areas SPAR1-SPARn. The pillar type (e.g. a first pillar type, a second pillar type, etc.) that may be determined/selected by a processing arrangement may be based on the pillar representation data and the surface distance characteristic such that a first pillar type may have a first pillar height, a first pillar material, a first pillar density, a first pillar hardness, and/or a first pillar shape while a second pillar type, different than a first pillar type, may have a second pillar height, a second pillar material, a second pillar density, a second pillar hardness, and/or a second pillar shape.

A data processing arrangement may determine a support pillar template that is provided as part of the manufacturing layout MAL. The support pillar template may include information regarding the type of support pillars, height, material, hardness, or shape, to be utilized at different positions in the gap 8 between panes to be paired. Thus, the height, material, hardness, or shape of the support pillars to be used at different positions between the panes selected/determined to be paired varies in accordance with the support pillar template suggestion and the estimated surface distance characteristic. This provides that the height, material, hardness, or shape of the support pillars varies in accordance with the surface topography of the panes to be paired, which may help to reduce localized stress forces after the pressure has been reduced in the gap between the panes.

The use of predefined support pillar heights, materials, hardness, or shapes may reduce the manufacturing costs of a VIG unit. For example, the manufacturing line may have access to a predefined number of predefined support pillar heights, materials, hardness, or shapes between 2 and 50, more specifically between 2 and 20, and in some embodiments between 4 and 10 different support pillar heights, materials, hardness, or shapes, in a support pillar storage. The heights, materials, hardness, or shapes of these may be accessible by the mentioned data processing arrangement, and the selection of pillars may thus be based on available pillar heights, materials, hardness, or shapes.

In at least one embodiment, a solder material such as a glass frit material, which in the end, after a heating process, may constitute the support pillars at support areas.

Figure 5B:
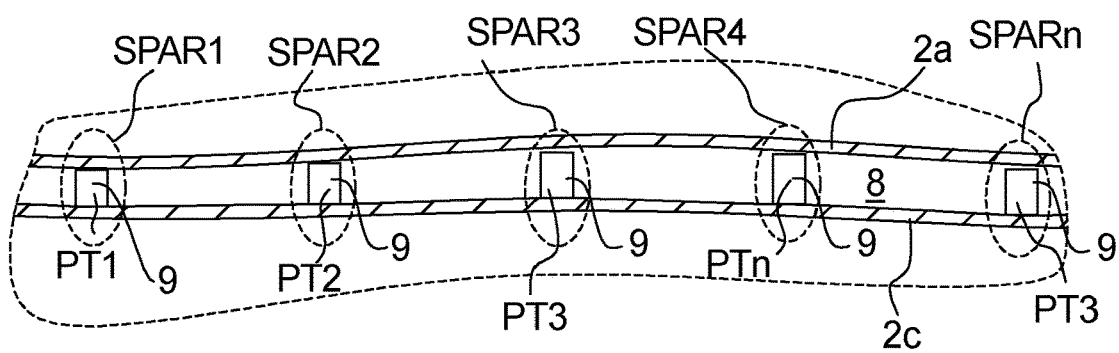

The result of this manufacturing layout MAL1 is provided in FIG. 5b, where it can be seen that the support pillars provided at the respective support area SPAR1-SPARn much better fits the surface variations at the respective support area, as the manufacturing layout MAL1 is adapted according to the estimated surface distance characteristic SDC for the panes 2a, 2c, which is based on the topographic representations relating to the specific panes as previously described.

Generally, by selecting the support pillars in accordance with an estimated resulting surface distance characteristic and/or topography representations, for panes decided to be paired to obtain a VIG unit, may help to reduce stress proximate the support pillars and/or may reduce the number of scratches over time provided by support pillars due to shear forces. The selection of different types of support pillars may help to inhibit support pillars from falling towards the bottom of a gap between the panes or displacing between panes, and/or the like. Additionally or alternatively, the selection of different types of support pillars may inhibit a support pillar from displacing from its initial, support position/area if the panes are subjected to external forces causing the panes to slightly deflect relative to each other.

The manufacturing layouts MAL1-MALn may moreover, in embodiments of the present disclosure comprise pane identifications PA1_ID, PA2_ID to identify the respective physical panes to which the respective manufacturing layout MAL1-MALn relate. This Identification information may be retrieved from the processed, estimated surface distance characteristic.

It is to be understood, that in embodiments of the present disclosure, the manufacturing layouts MAL1-MALn may be considered separate to the estimated surface distance characteristic, but in other embodiments of the present disclosure (not illustrated), the surface distance characteristic SDC1-SDCn may be configured so that it also comprises the manufacturing layouts MAL1-MALn (or vice versa), and may thus share the pane identification information PA1_ID, PA2_ID.

In preferred embodiments of the present disclosure, an output data 5 is provided based on the manufacturing layouts MAL1-MALn, and the content of this output data 5 may be utilized during subsequent manufacturing of said vacuum insulating glass (VIG) units to provide VIG units in accordance with the manufacturing layouts MAL1-MALn.

FIGS. 6-7 and 9-10 illustrates flowcharts relating to different data processing provided by the processing arrangement 6 and/or 12 according to different embodiments of the present disclosure.

Figure 6:
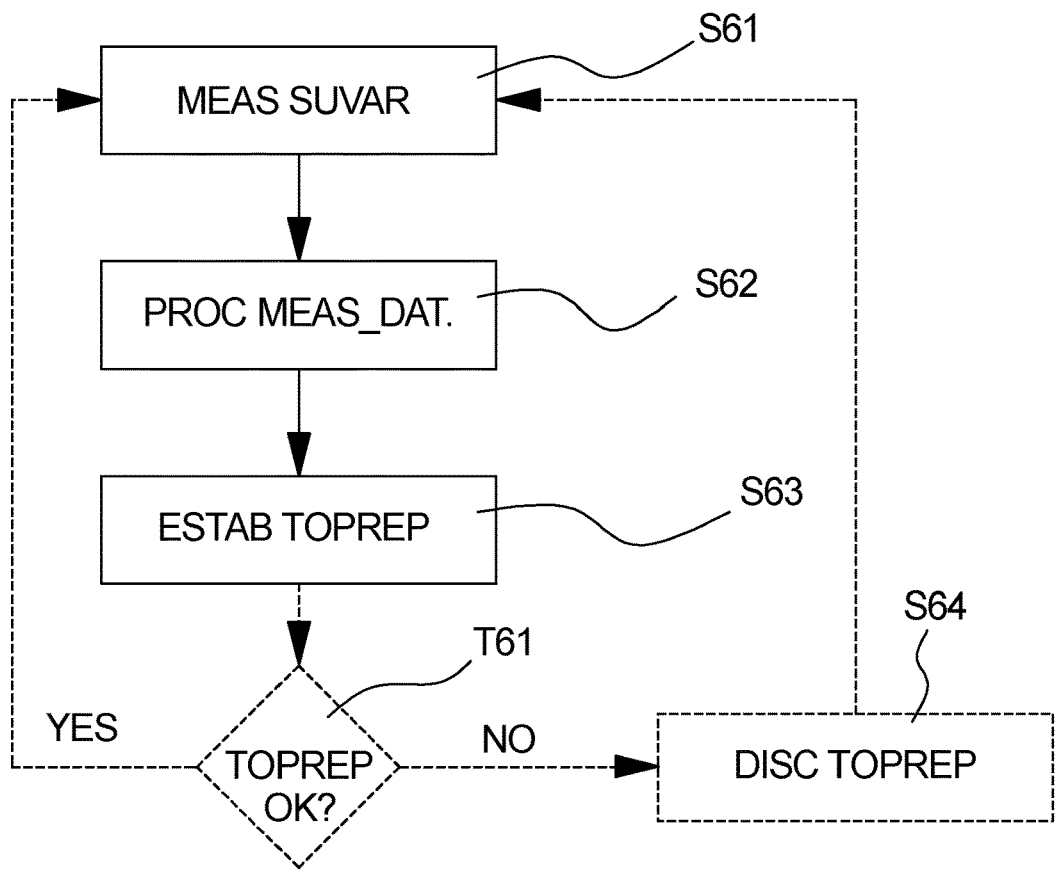
FIGS. 6-7: Illustrates flowcharts according to various embodiments of the present disclosure.

In FIG. 6, the topographic representations TOPREP_2a-TOPREP_2n are established.

The measurement arrangement 3 provides in step S61 (MEAS SUVAR) the surface variation measurement data 4 as disclosed in relation to FIGS. 1 and/or 4.

This measurement data 4 is processed by the processing arrangement 6 and/or 12 in Step 62 (PROC MEAS_DAT), and the result of this processing is stored in a data storage in step S63 (ESTAB TOPREP). In embodiments of the present disclosure, Steps S62 and S63 may be considered as one step.

The topographic representation may then optionally be processed in test T61 (TOPREP OK?) to determine if the established, topographic representation is considered valid. This may be determined by processing the topographic representation in order to determine if the determined topographic representation lies within predefined thresholds, and thus may be considered as suitable for a VIG unit, or not. If the test T61 turns out negative, i.e. the topographic representation is not considered valid/OK it may be discarded in step S64 (DISC TOPREP) and measurement data 4 from a new pane may then be processed (S61). The test T61 may also in other embodiments of the present disclosure be provided during the processing in step S62.

If the test T61 turns out positive, and the topographic representation is thus considered OK for a VIG unit, the TOPREP is maintained and measurement data 4 from a new pane may then be processed (S61).

If the test T61 is not provided, the processing arrangement may continue to step S61 after step S3.

It is understood that in other embodiments of the present disclosure, the test T61 and the steps (S61-S63) may be provided in different processing cycles, e.g. parallel cycles.

Figure 7:
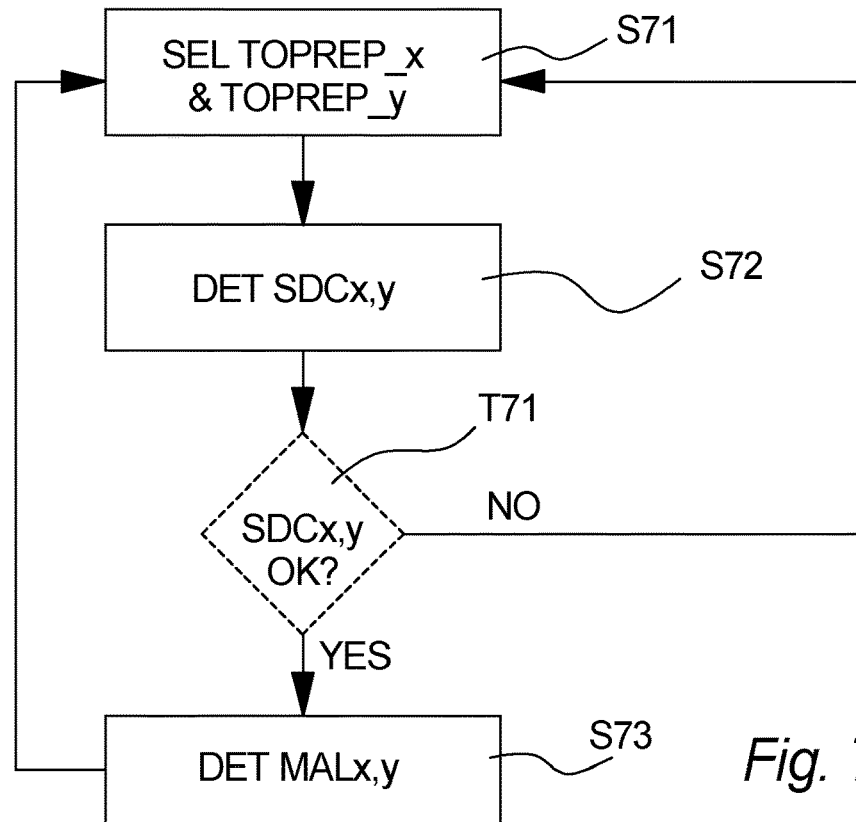

FIG. 7 illustrates embodiments of the present disclosure where surface distance characteristics SDC are determined based on topographic representations TOPREP, topographic representations provided as explained according to one or more embodiments described above.

Two topographic representations TOPREP_x, TOPREP_Y are selected in step S71 (SEL TOPREP_x & TOPREP_Y), and the processing arrangement 6 processes the data of these in step S72 (DET SDCx,y) in order to determine a surface distance characteristic SDC for these specific panes. x,y may refer to a pane identifier PA_ID of the respective pane assigned the respective Topographic representations explained above, it may relate to a data address for the respective topographic representation, a topographic representation number or the like.

The data processing arrangement 6 may in test T71 (SDCx,y OK?) optionally determine if the determined surface distance characteristic is considered ok, this may be provided as disclosed in FIG. 9.

When the surface distance characteristic has been determined, the data processing arrangement in step S73 (DET MALx,y) determines a manufacturing layout MALx,y for the panes x,y based on the surface distance characteristic SDCx,y. This may be provided as disclosed in relation to FIG. 9.

In other embodiments of the present disclosure, the processing arrangement may, in step S72 also determine the Manufacturing layout MALx,y during determination of the surface distance characteristic SDC for these specific panes.

FIG. 8 illustrates an example, (exaggerated to improve the understanding) of surface variations of panes 2a, 2c, such as panes from thermally tempered glass. This surface variation SVAR1, SVAR2 may lie within the range of 0.05 mm to 0.3 mm, such as in the range of 0.09 mm to 0.17 mm from the highest "peak" to the lowest "valley," or in some embodiments the surface variation may lie within the range of 0.1 to 0.15 mm, naturally, a minor number of outliers may occur. Such variations may be present due to "roller waves" caused by supporting rollers which supports the pane during manufacturing of the pane, due to "edge lift" causing the pane to deflect between two opposite edges of the pane, thereby causing a parabola or hyperbola shape of the pane and/or the like.

The surface variation SVAR1, SVAR2 of two different panes are illustrated for the same/comparable support areas SPAR1-SPAR3 of the pane surface, SPAR1 of pane 2a is comparable to SPAR2 of pane 2c, and may thus, if the panes 2a, 2c are paired too provide a VIG unit, be arranged opposite to each other and be configured to be support areas between which a support pillar (not illustrated in FIG. 8) is placed.

Generally, it is to be understood that the distance between two neighbouring pillars, and thus support areas SPAR, may preferably be in the range of 20 mm to 50 mm, about 40 mm, and is preferably substantially similar between all pillars in the final VIG unit. Accordingly, for a VIG unit of 2000 mm×2000 mm, with pillars having an intermediate distance of about 40 mm, this may result in about 2500 support areas SPAR, and the processing arrangement 6 may in preferred embodiments of the present disclosure determine a surface distance characteristic SDC based on data relating to topographic surface characteristics, the height measured at no more than 97% such as no more than 80% no more than 60% of a plurality of predetermined support areas. The surface variation at the remaining support areas may thus be estimated by interpolation or any other suitable estimation method. In further embodiments of the present disclosure, the measurement arrangement may provide input of the surface variation at substantially all of the predetermined support areas such as at about 100% of these support areas. The characteristics at support areas SPAR which are not directly measured may instead be estimated using method of interpolation based on a number of directly neighbouring support areas SPAR. This method of interpolation could also be dependent on stored trends based on previously measured surface variations SVAR.

The resulting topographic representation TOPREP in a data storage, obtained by a measurement arrangement in accordance with embodiments of the present disclosure, may be as Table 1 below (however only showing three support areas for the sake of simplicity), which is based on FIG. 8.

TABLE 1

| TOPREP_2a | TOPREP_2c | $SDC_{2a,2c}$ |
|---|---|---|
| SPAR1 = HI1_1 | SPAR1 = HI2_1 | $\Sigma\ HI_{SPAR1}$ = HI1_1 + HI2_1 |
| SPAR2 = HI1_2 | SPAR2 = HI2_2 | $\Sigma\ HI_{SPAR2}$ = HI1_2 + HI2_2 |
| SPAR3 = HI1_3 | SPAR3 = HI3_3 | $\Sigma\ HI_{SPAR2}$ = HI1_3 + HI2_4 |

As can be seen, from the above, the estimated resulting distance deviation for a surface distance characteristic relating to SPAR1 at a predetermined position (identified by x,y coordinates) is HI1_1+HI2_1. This may be provided at step S72, see FIG. 7. In embodiments of the present disclosure, the glass pane surface profile is normalised the data set may be normalised relative to the measured value at SPAR 1, such that the surface characteristics measured at further points are presented relative to SPAR 1. For each glass pane, negative values may represent a variation in surface height relative to SPAR1 which corresponds to a protrusion/peak (towards the glass pane which it is paired with upon pairing) and positive values may represent valleys relative to SPAR1. When the surface distance characteristics between two glass panes are estimated, the summation of the surface characteristics for common SPAR positions relative to SPAR1 may be either positive, indicating a large gap between the panes at that SPAR position, equal indicating no gap between the panes or the panes would be touching or a negative value indicating that there would exist an overlap in the protrusions (even if this is physically impossible).

The measurement arrangement 3 measures the surface characteristics relating to the spatial height of a glass pane at a plurality support areas SPAR at pre-determined positions across the glass pane. The measurement arrangement may be based on a detection of electromagnetic waves, such as an optical measurement arrangement, measuring the variation in height across the surface based on reflected light, such as white light or laser light.

The operation of the optical measurement arrangement may in embodiments of the present disclosure be based on a measure of interference between an initial transmitted wave and a reflected wave, wherein the phase shift i.e. the interference pattern created upon superposition of the waves relate to the height of the surface in relation to the wavelength used.

The measurement, such as an optical measurement arrangement, arrangement may, in other embodiments of the present disclosure, alternatively be based on optical detection of scattered light or specular reflected light from the surface, where the angle of reflected light is dependent on the planarity of the surface.

The measurement arrangement 3, such as an optical measurement arrangement, may in further embodiments of the present disclosure comprise a focus detection arrangement arranged to measure a reflected light as a lens is moved vertically, i.e. perpendicular to the glass panes. The lens may thus be moved relative to the pane until the focus point for the incident light is obtained and the movement of the lens in order to focus the light, i.e. the vertical displacement relates to the height of the surface. This method may be advantageous for detecting waviness of a surface, and for larger surface roughness up to approximately 1 mm.

The measurement arrangement 3 may also, in embodiments of the present disclosure, comprise of a physical measurement arrangement comprising one or more stylus devices, arranged in direct contact with the glass surface and moved across the surface such as to register any physical height variations across in order to generate a surface profile. The deflection of the stylus may be registered mechanically or optically such as by reflecting of light of an area of the stylus, where the angle reflection changes as the stylus is deflected due to changes in the surface topography.

The data generated by the measurement arrangement may thus, in embodiments of the present disclosure, comprise information of the heights measured at each predetermined position relative to a reference point REF. This reference point may be a point, a line or a plane. In embodiments of the present disclosure, the height may be calculated relative to a levelling stage or relative to the measurement arrangement itself which it may be set to move in a pre-determined plane.

In embodiments of the present disclosure, a measurement at a first support area SPAR1 may produce the data set comprising a first measured value HI1_1 which may be set as an internal reference point for further measured values HI1_$n$ across the pane such that a relative height may be computed, stored and possibly displayed. Any value HI1_$n$ may be used as internal reference for the glass pane, a maximum value, a minimum value or an average value of the height. This may for example be advantageous interpretable information for the operator in the operation of the measurement arrangement for checking whether or not the measurements is valid or if there is something wrong with the measurement. Furthermore this value for the relative height may be useful in the pairing process, an example hereof is described below.

By setting a value for the distance D1 between the area SPAR1 of a first glass pane and the area SPAR1 of a second glass pane, by determining that said support areas SPAR1 are to be separated by a distance D1 of D1=0.2 mm, the distances between the reminding support areas of the paired panes may be calculated as their relative heights are known relative to SPAR1 of the first or second glass pane. This calculated value may be comprised in the surface distance characteristics SDC for the pair of glass panes. Such a value may be used as input for selecting a support pillar height to be arranged between the panes at the respective support area.

The distance D1 (see FIG. 4$a$), may in embodiments of the present disclosure be set to different values within a range of values [D1$n$-D1$m$] and the preferred distance may be found based on an assessments the distances between support areas SPAR of the panes. The preferred distance D1 may correspond to a setup having large amounts of distances which can be maintained using a pillar selected from a pool of available pillars with a range of discrete pillar heights H1-H$n$ In one or more examples, the highest peak (i.e. SPAR1 for pane 2$a$, and SPAR3 for pane 2$c$) may be used as reference REF, but it is understood that any suitable reference may be used such as the lowest valley, the first measured value, a calculated mean height reference calculated as $$HI_{mean} = \frac{\sum_{1 \to n} HIn}{n}$$

For example, the mean height value for pane 2$a$ may be determined using the above equation in the following way $$\frac{\sum_{1 \to n} HI1_n}{n} \to \frac{HI1\_1 + HI1\_2 + HI1\_3}{3} = HI_{mean}2a$$

This may thus result in positive and negative values of the HI1-HI$n$ dependent on if the height difference from the reference REF relates to a peak or valley. For comparison of surface profiles of different panes, the height values may in embodiments of the present disclosure be normalised based on a common reference position, such as SPAR1. One glass pane may represent several SPAR1 positions dependent on the orientation of the glass relative to the glass pane it is paired with.

It may in embodiments of the present disclosure be preferred for the measurement arrangement 3 that the glass panes to be measured are placed with their major surfaces perpendicular to the direction of the incident electromagnetic radiation such as a light wave, as tilting of the pane may cause the reflected light to miss the detection window.

Prior to pairing glass panes by means of a processing arrangement, a levelling of data points may be needed such that the major surfaces of the glass panes are in the most parallel alignment to each other for assessment of the gap distances D$n$. This comparative levelling may be executed based on parallel alignment of a 1D line profile or a 2D plane for each plane generated based on the average height value HImean calculated based on a plurality of points across the pane. This is an advantageously viable method, as the overall macro-shape of the glass panes are considered to be similar. Note that levelling might not be necessary at all, especially if the glass panes are hung from a ceiling and aligned naturally based due to applied gravitational force on the panes.

Generally it is to be understood that the topography representations and/or the estimated surface distance characteristics SDC may be determined/established in other ways not directly described in this document. For example the determined reference REF, Height representation (HI1-HI$n$) of a pane surface at a support area and/or a distance D1 between panes may be represented and processed in any suitable way in order to obtain data that may be compared/correlated to provide surface distance characteristics SDC, determine pillar heights, pane orientations and/or the like.

Likewise, it is understood that the measurement arrangement may be any suitable type of measurement arrangement considered fast and precise enough to obtain measurement data 4 representing surface variations of the panes 2$a$-2$n$.

FIG. 9 illustrates an example of testing whether a surface distance characteristic SDC may be considered ok, and this may in embodiments of the present disclosure provide the "YES" or "NO" selection as illustrated in test T71 (SDCx,y OK?) of FIG. 7.

Initially, z is set to 1 in step 91. Z represents a position such as a support pillar area SPAR as previously explained, given by (x,y) coordinates with reference to a predetermined set-point such as a corner of the pane, the position of a unique identifier of the pane or the like.

The data processing arrangement 6 tests in step S92 (TE SDC SPARz) the surface distance characteristic for the relevant SDC at a support pillar area area/point SPARz, by determining/estimating if the SDC for this area lies within a predefined threshold such as a distance threshold.

This information may then be stored, and the next surface distance characteristic for the next support pillar area area/point SPARz may then be tested (by incrementing z if the surface distance characteristic for all support areas SPAR have not been tested, see test TE91 and step S93). When this test is done, the processing arrangement 6 may process the test results from step 72 to determine if the pane or surface distance characteristic is OK and not and if it is OK, the processing arrangement 6 may start to determine a manufacturing layout based on the surface distance characteristic SDC.

Figure 10:
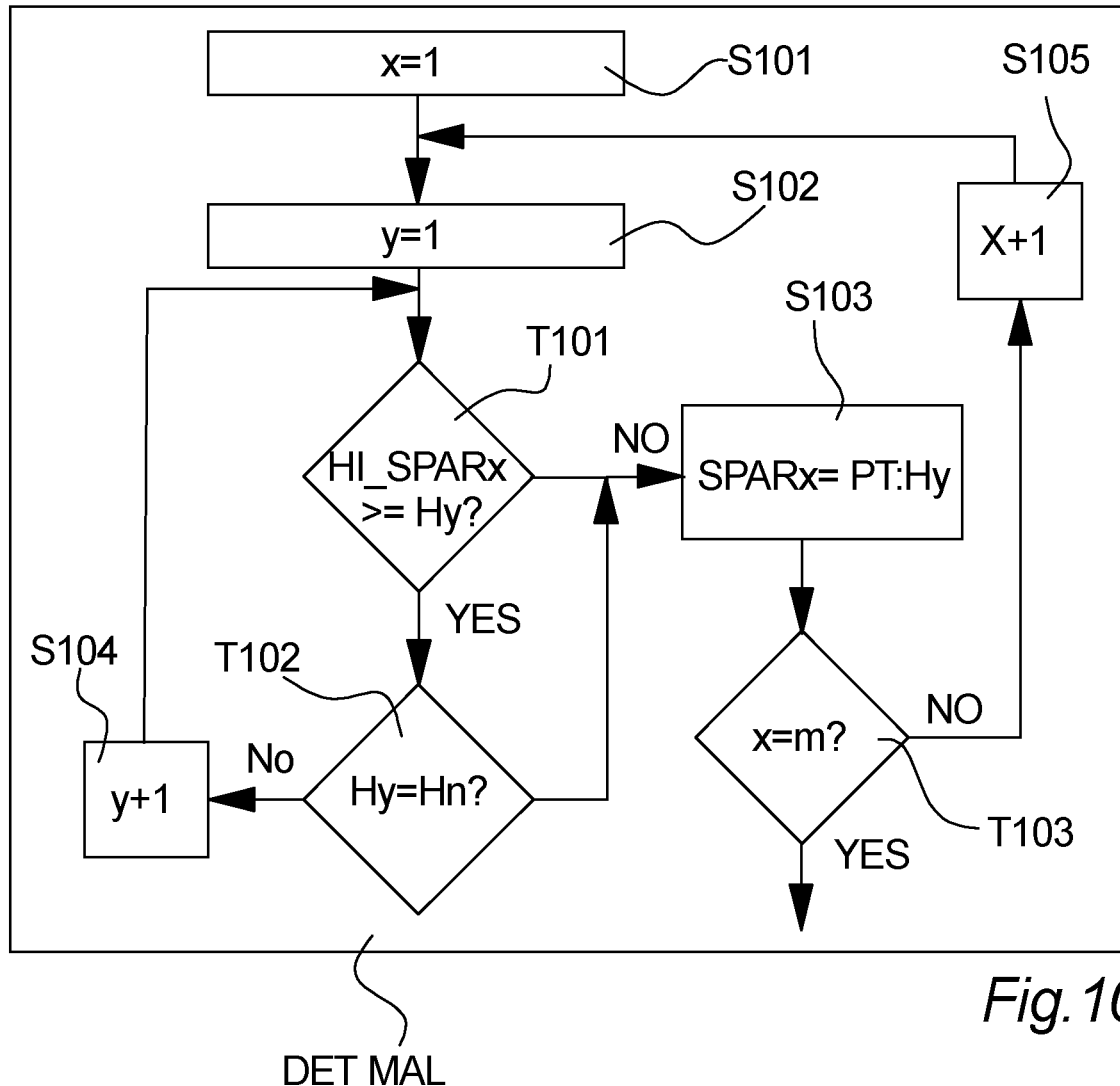
FIG. 10: Illustrates a flow chart according to further embodiments of the present disclosure.

FIG. 10 illustrates, in a flow chart, embodiments of the present disclosure relating to selection/establishment/determination of a manufacturing layout MAL based on a surface distance characteristic. This flowchart may in embodiments of the present disclosure provide or be part of the determination of a manufacturing layout MAL as described in relation to step S73 of FIG. 7.

The manufacturing layout MAL may include pillar type information PT_INFO regarding support pillars 9 such as at least one of a pillar height, pillar material, pillar hardness, and a pillar shape, to be utilized when combining two or more panes to provide a VIG unit in relation to different pillar heights at different predefined support positions/areas SPAR1-SPARn in the gap 8 between the pair of panes. The information of the support pillars may represent a grid of support pillars to be distributed onto the predetermined support positions/areas SPAR1-SPARn between surfaces of panes to be assembled to provide a vacuum insulating glass assembly. The manufacturing layout MAL may also include information regarding how panes should be orientated relative to each other, it may comprise information regarding which specific panes may be combined (based on a unique identifier of the pane) and/or the like.

"x" in FIG. 10 relates to a support area (SPAR) number for a given support area, and "y" in FIG. 10 relates to a predetermined height threshold.

Initially, x is in step S101 set to one when starting determination of a manufacturing layout MAL related to a surface distance characteristic SDC. The number of support areas processed is given by "m"

Then y is set to 1 so that the data processor starts with a first threshold value related to a pillar height. This may be based on a predefined number of thresholds between Hy and Hn. Thus, the data processor arrangement 6 determines in test T101 (HI_SPARx>=Hy?) whether the height at a first support area SPAR1 is larger than or equal to the first threshold value Hy such as a pillar height. Generally, it is understood that SPARx may refer to a specific support area at a specific coordinate or the like.

If it is higher, the data processor testes in test T102 if the threshold height that was tested for in test T101 corresponds to a predetermined maximum threshold Hn. If this test T102 turns out positive, the pillar type PT is assigned the highest pillar type in step S103 (SPARx=PT:Hy). In other embodiments of the present disclosure, it may instead result in that the manufacturing layout is discarded and the related surface distance characteristic are discarded from the data storage, and/or that the panes related to the manufacturing layout are removed from the data storage.

If the test T102 turns out negative, the height at the first support area SPAR1 is tested against the next threshold (illustrated by incrementing "y" in step S104 and so that a new threshold is provided in test T101), and this is done until either the test T101 turns out negative, or the largest threshold Hn has be reached (Test T102).

When the data processor arrangement 6 determines that the height at SPAR1 is less than a given threshold in Test T101, the data processor assigns in step S103 (SPARx=PT:Hy) a pillar height to the specific support area matching the relevant threshold. Then x is incremented in step S105 in order to have pillar heights/types selected for the next support area SPAR1, until the last support area SPARm has been tested, this is tested in test T103 (x=m?).

If test T103 turns out positive, the final support area has been tested and thus, pillar heights have been assigned to all support areas SPAR1-SPARm in accordance with the surface distance characteristic SDC.

A manufacturing layout may thus, in embodiments of the present disclosure be represented in a Table, list of the like, as illustrated in Table 2 below, see also reference "PT_INFO" in FIG. 5. This Table may thus also comprise other information such as pane identification, pane orientation information and/or the like.

In the Table 2 below, information of the pillar type or height for each coordinate SPARx, SPARy is provided in a manufacturing layout. Here, y relate to a row number/position in an imaginary support "pillar grid" layout, and x may relate to a column number/position in an imaginary support "pillar grid".

TABLE 2

| | MAL | | | | |
|---|---|---|---|---|---|
| | SPARx = 1 | SPARx = 2 | SPARx = 3 | SPARx = 4 | SPARx = m |
| SPARy = 1 | PT1 | PT2 | PT1 | PT3 | ... PTn |
| SPARy = 2 | PT2 | PTn | PT3 | PT3 | ... PT3 |
| SPARy = 3 | PTn | PT3 | PT2 | PT3 | ... PT2 |
| ½SPARy = 4 | PT3 | PT1 | PTn | PT1 | ... PT2 |
| ... | ... | ... | ... | ... | ... ... |
| SPARy = n | PT2 | PT3 | PT1 | PT3 | ... PT2 |

The Table representation in Table 2 may thus be considered to represent height H at the respective support area SPAR as a function of the displacement across a plane H(x,y). In other embodiments of the present disclosure the topographic representations (TOPREP_2a-TOPREP_2n) and/or said surface distance characteristics (SDC1-SDCn) or the manufacturing layout(s) MAL may comprise information of height (HI1-HI_n) and/or distance (D1-Dn) as a functions of a lateral displacement H(x), and/or information of height (HI1-HI_n) and/or distance (D1-Dn) as a function of the displacement across a surface plane H(x,y).

This information of Table 2 may thus be used during subsequent manufacturing of VIG unit, and a pillar distribution arrangement may thus be controlled by a data processor configured to process the information/data of the manufacturing layout MAL, such as the above Table 2, and thus select pillars in accordance with the manufacturing layout to distribute different pillar types, having different heights, at the different support areas given identified by the manufacturing layout MAL in one way or the other.

The support pillar type to be utilized at different pre-defined support areas may be identified in a manufacturing layout stored in a data storage and/or is transmitted/provided as an output data 5. This information may thus be used to place the support pillars during manufacturing of a VIG unit.

The manufacturing layout MAL provides large freedom in producing the VIG, as it may be utilized at one or more different manufacturing sections where support pillars are selected and/or placed at one of the panes, where the panes are combined and/or the like.

Figure 11:
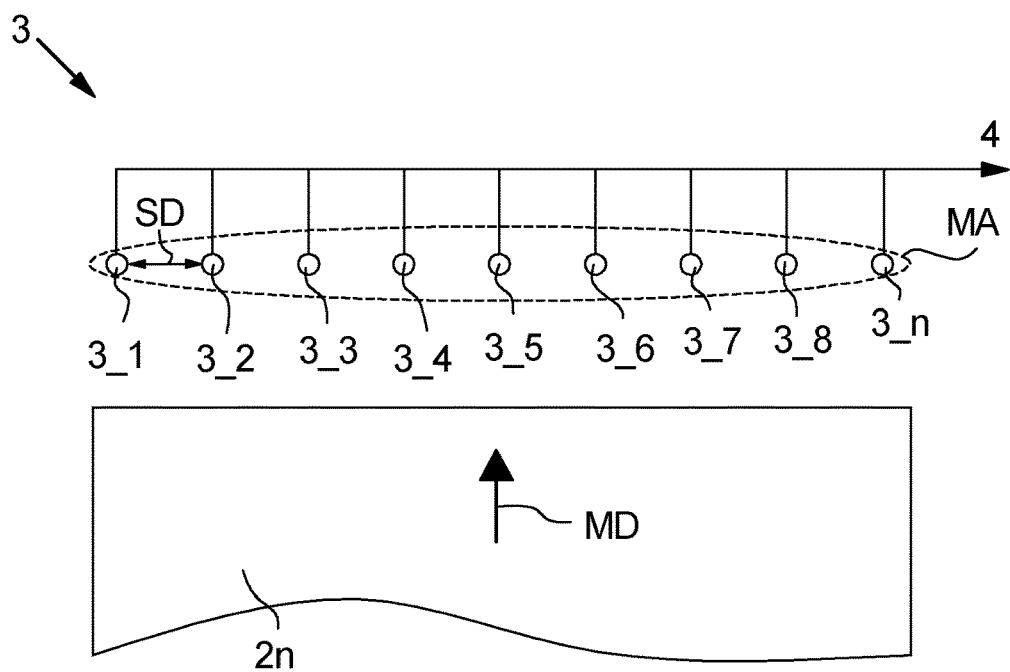
FIGS. 11-12: Illustrates examples of a measuring arrangement according to embodiments of the present disclosure.

FIG. 11 illustrates an example of a measuring arrangement 3 according to embodiments of the present disclosure.

The measuring arrangement comprises sensors $3\_a\text{-}3\_n$ which are distributed across a measuring area MA (indicated/surrounded by dashed lines) in a direction transverse to a movement direction MD of a pane 2n which is to be subjected to a measurement to determine a surface topography.

The sensors are preferably arranged in a substantially linear row as indicated in FIG. 11.

The mutual sensor distance SD between adjacent sensors in the rows is preferably, in embodiments of the present disclosure between 20 mm and 600 mm, such as between 40 mm and 450 mm, between 30 mm and 150 mm.

The measuring arrangement may in embodiments of the present disclosure comprise between 1 and 500 sensors $3a\text{-}3n$ such as between 10 and 1000 sensors, about 5-200 sensors, such as between 10 and 80 sensors.

The pane 2n may in embodiments of the present disclosure be moved in the movement direction MD substantially continuous across/through the measuring area MA and the measuring arrangement may be configured to register/determine the surface variation of the pane during this movement.

The pane 2n may in other embodiments of the present disclosure be moved in the movement direction MD in steps across the measuring area MA with intermediate movement breaks, and the measuring arrangement may thus be configured to register/determine the surface variation of the pane surface during the breaks before the next movement.

Figure 12:
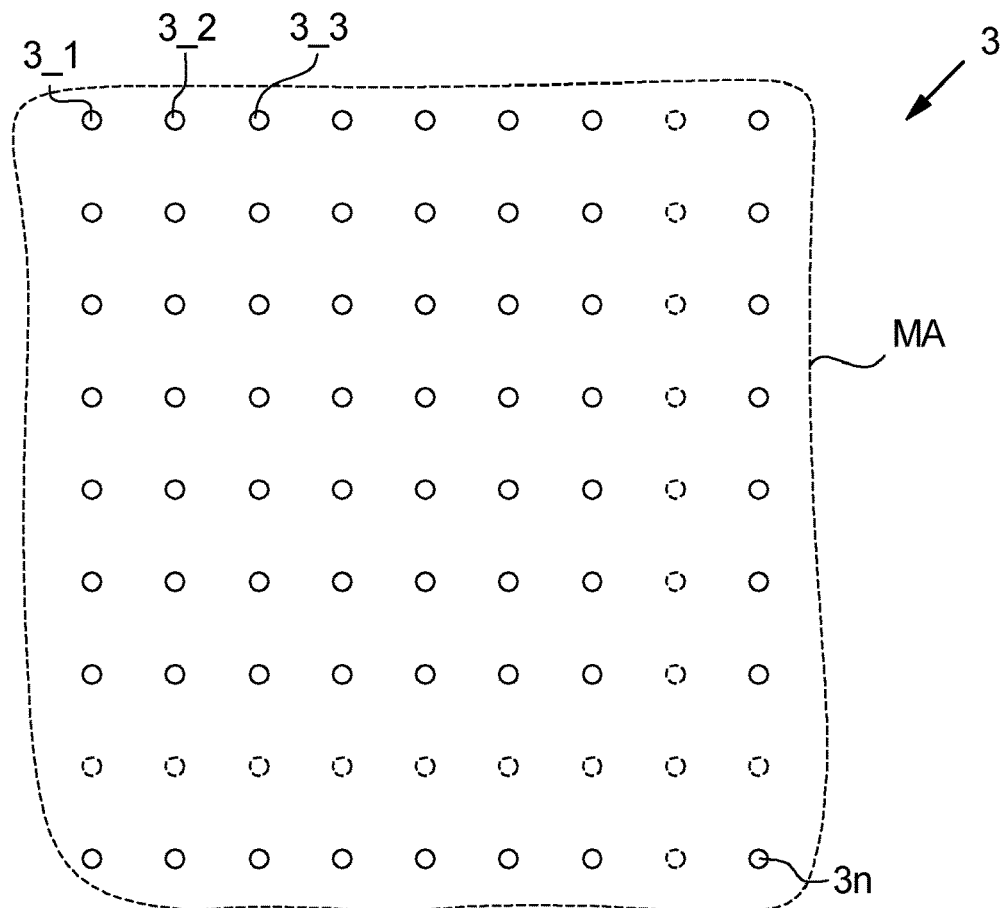

FIG. 12 illustrates another example of a measuring arrangement 3 according to embodiments of the present disclosure. In this embodiment, the measuring arrangement comprises a plurality of sensors $3a\text{-}3n$ arranged in a sensor grid, such as in rows and columns. The plurality of sensors ($3\_a\text{-}3\_n$) are distributed across a measuring area (MA), preferably in one or more substantially linear rows, wherein the mutual distance between adjacent sensors in said one or more rows preferably is between 20 mm and 600 mm, such as between 40 mm and 450 mm, e.g. between 30 mm and 150 mm. The Input 4 from measuring arrangement provided by the sensors $3\_a\text{-}3\_n$ is not illustrated in FIG. 12 to ease understanding of the figure.

This may provide that the pane may be arranged within the measuring area MAR and thus, only a single measuring operation may be needed, if the measuring area is considered large enough compared to the surface area of the pane. Alternatively, only a few measuring operations may be needed.

In embodiments of the present disclosure, the sensor grid may comprise between 10 and 1000 sensors $3a\text{-}3n$ such as between 30 and 400 sensors, between 50 and 200 sensors arranged in parallel rows and columns.

The number of sensors may in embodiments substantially or at least correspond substantially to the number of support areas for a pane. In other embodiments of the present disclosure, the number of sensors may be less than the overall number of support areas SPAR to be used, (but may correspond to the number of support areas in the transverse direction of the pane). The measurement arrangement may in embodiments of the present disclosure be configured to measure the height value of several support areas SPAR along a line extending across the pane in the transverse direction, from which data a surface profile of the line may be provided. A collection of surface line profiles can be combined in parallel to provide a 2D topographic representation of the glass pane.

The measurement data 4 from the measurement arrangement 3 may be interpolated in order to determine/estimate a topography representation based on one or more measurement values representing nearby/neighbouring areas of the respective pane neighbouring line profiles. The interpolated value or line profile may be an average of the neighbouring points or lines respectively.

A value may additionally or alternatively be estimated based on pre-stored values in stored data. For example, certain types of glass panes mainly comprises a surface variation providing mainly oscillative pattern, in which valleys are separated by peaks along the line of measurement. In such situation, it may be possible to accurately estimate the height values between points of measurement and incorporate these in the topographic surface representation. The data processing arrangement 6 may in embodiments of the present disclosure be configured to recognize a line profile pattern based on the data obtained from the measurement of the glass pane.

Figure 13:
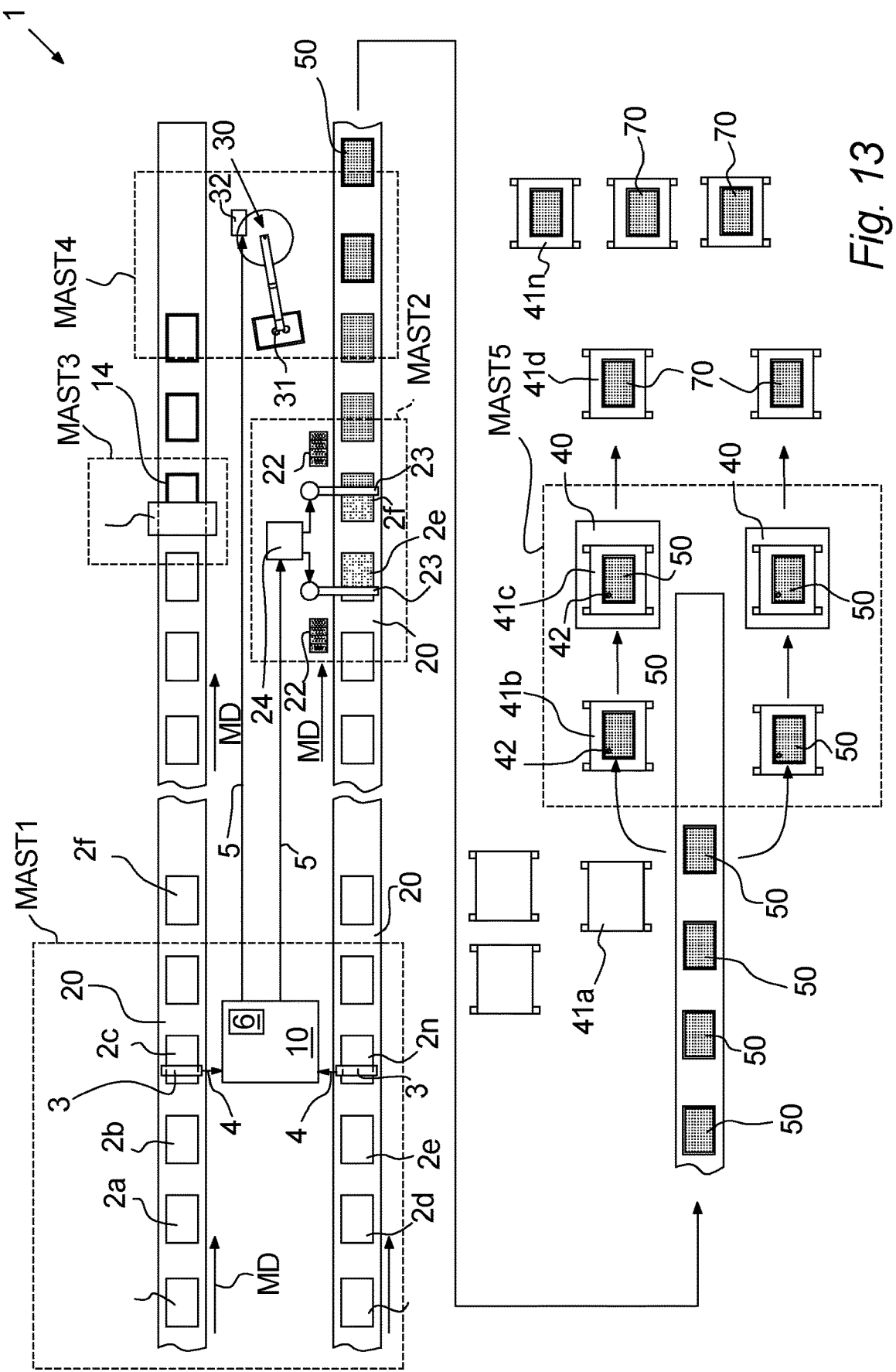
FIG. 13: Illustrates a VIG unit manufacturing facility according to various embodiments of the present disclosure.

FIG. 13 illustrates an example of a VIG unit manufacturing facility 1 for providing VIG units in accordance with estimated surface distance characteristics in accordance with embodiments of the present disclosure. The manufacturing facility 1 comprises different manufacturing stations MAST1-MASTn where different parts of the manufacturing of the VIT units are provided, embodiments of these manufacturing stations MAST1-MASTn are described in more details below. These manufacturing stations MAST1-MASTn may be located in different buildings, at the same or different geographical locations or the like, or two or more of the manufacturing stations MAST1-MASTn may be located in the same building according to various embodiments of the present disclosure.

The manufacturing facility 1 comprises a first manufacturing station MAST1 where the topography representations are determined and processed, and manufacturing layouts MAL are provided and an output data 5 are generated based thereon. This may be provided in accordance with the embodiment described above or below.

The panes are in this embodiment arranged to provide a parallel measuring of the panes, and are thus arranged at parallel transportation arrangements 20, where and two measuring arrangements 3 provides the measurement data 4 comprising information/data of the surface variations of panes $2a\text{-}2n$ subjected to the measurement. In other embodiments of the present disclosure, the first manufacturing station MAST1 may comprise a single line solution, where panes are not arranged in parallel during the measurement of surface variations.

When the surface distance characteristics (and also manufacturing layouts) have been provided, some of the panes enter the next manufacturing station MAST2 which is a support pillar distribution station where support pillars 9 are distributed at the predefined support areas on the surface of the paired pane elements ($2a\text{-}2n$). The pillars are in preferred embodiments of the present disclosure support pillars selected from a support pillar storage 22 comprising different pillar types, having different pillar heights H1-Hn as explained previously.

The pillar distribution station MAST2 comprises one or more pillar placement arrangements 23. The pillar placement arrangement 23 may include a robotic arm, a distributed set of support pillar outlets and/or the like, which may be operated by a data processor in accordance with the data of the manufacturing layouts. Thereby, the support pillars may be placed automatically in accordance with the individual topographic representations and/or the SDC, and thus, an individualized manufacturing of VIG units may be provided.

In the present example, two pillar placement arrangements 23 such as a robotic arm solution is configured to distribute and place a plurality of support pillars from the support pillar storage(s) 22 and onto an upwardly facing surface of the respective panes (in the example 2e-2f) proximate the SPAR, while the panes are moved or kept still on a pane transportation arrangement 20.

A pillar distribution controller 24 comprising control circuitry and a data processor arrangement, comprising one or more hardware processors, a data storage and/or the like, thus receives input 4 from the first manufacturing station MAST1 regarding how to place the pillars. This output data 5 may comprise the surface distance characteristic SDC, and the pillar distribution controller 24 may thus, in embodiments of the present disclosure, be configured to calculate/determine a support pillar layout, as explained above in relation to one or more of FIGS. 4, 5-5c, FIG. 10 and/or Table 1 and/or 2 above.

In further embodiments of the present disclosure, the output data 5 may merely comprise topographic representations TOPREP, and the pillar distribution controller 24 may thus be configured to determine surface distance characteristic SDC and/or Manufacturing layouts MAL based on this data.

The pillar distribution controller 24 thus controls the pillar placement arrangements 23 to distribute the support pillars on the pane surface at the desired/determined support areas SPAR.

Preferably, the support pillars are pre-manufactured and are made from a metal, polymer material or the like having a predetermined height H1-Hn. However, in other embodiments of the present disclosure, which is not illustrated, the pillar placement arrangements 23 may be configured to place a solder material such as a glass frit material, which in the end, after a heating process, may constitute the support pillars at the support areas SPAR. In such embodiments, the pillar placement arrangements 23 may comprise an outlet for providing a predefined amount of solder material from a solder storage, in a paste state, in accordance with the estimated manufacturing layout and/or surface distance characteristic.

The Support pillar distribution station MAST2 may in embodiment of the present disclosure comprise a scanning arrangement configured to scan and process pane identifications such as unique identifiers UID, (see description in relation to FIG. 4) on the panes 2a, to assure that the pillars placed on the respective pane correspond to the correct data from the first station MAST1.

Other panes, not supplied with support pillars, enters a manufacturing station MAST3 after the first station MAST1. This station MAST3 is an edge sealing distribution station, where an edge sealing 14 is distributed around/near the edges of the panes to provide the edge sealing and enclosing the gap 8. At least one of the panes may comprise an opening through which the gap between the panes has been evacuated before closing the opening, also with a solder such as glass frit material. The edge sealing material may be a solder material such as a frit paste material comprising glass frit, a solvent and/or a binder material.

In other embodiments of the present disclosure, the edge sealing may be provided by other means, at another location in the VIG unit manufacturing process and may not be an edge sealing 14 arranged between the panes. may comprise clamps for squeezing the panes towards each other, and may thus first be provided after Manufacturing station MAST4.

After this, the panes leaving the support pillar distribution station MAST2 and the edge sealing distribution station MAST3, enters a pane pairing station MAST4. The pane pairing station MAST4 is configured to arrange and align pane elements (2a-2n) to be paired.

The pane pairing station may comprise a pane placement arrangement 30, comprising a robotic arrangement including a robotic arm for placing the pane elements from the station MAST3 on the panes from the second station MAST2 comprising the distributed pillars.

The pane placement arrangement 30 may comprise a controllable suction cup arrangement 31 for this purpose. The pane placement arrangement 31 orientates the first pane from the edge sealing distribution station MAST3 so that the edge sealing 14 thereon faces downwards. This may be provided by rotating a part such as a part of a robotic arm. The pane placement arrangement then places this pane on the upwardly facing surface of the pane comprising the distributed support pillars.

The pane placement arrangement 30 may in embodiments of the present disclosure comprise a scanning arrangement (not illustrated) configured to scan and process pane identifications such as unique identifiers UID, (see description in relation to FIG. 4) on the panes 2a, to assure that the correct panes are paired. This may be based on an output from the measuring station MAST1. Thus, the pane placement arrangement may comprise a pane placement controller 32 comprising a hardware processor and other relevant electronic circuitry configured to compare scanning results from such a scanning arrangement with the data from the measuring station MAST1, to assure that the scanned identification UID of the pane to be handled by the pane placement arrangement 30 correspond to the pane to be paired with an available pane comprising distributed support pillars.

When the panes leaves the pane pairing station MAST4, a VIG assembly 50a-50n having distributed pillars and an edge sealing 14 between the panes is obtained.

After this, these VIG assemblies from the pane paring station MAST4 enters a VIG heating and gap evacuation station MAST5. At this station, the pane assemblies are arranged on support trolleys 41a-41n or other types of support arrangements. Then the VIG assemblies are provided with a suction cup over the evacuation opening 13, and loaded into a heating furnace 40.

In the furnace 40, the VIG assemblies are heated, to melt the solder material of the edge sealing 14, a pump (not illustrated) reduces the pressure in the gap 8 between the panes through the evacuation opening by means of the suction cup 42, and the evacuation opening 13 is then sealed by an evacuation opening sealing, (based on a solder material such as a frit material heated to seal the evacuation opening). After the heating process, and also subsequent, controlled cooling, in the furnace 40, the VIG units 70 leaves the furnace 40 to further cool, and it may then subsequently be mounted in a window frame, and mounted in an aperture of a building. When providing VIG units 70 for apertures of building such as windows, door and the like, it is important that such VIGs can withstand the external forces such as wind forces, rain, hailstorms, objects hitting the pane, temperature differences between inside and outside the building and the like. Some of these forces may strike the VIG at a local area of the pane and/or at the entire pane surface.

Figure 14A:
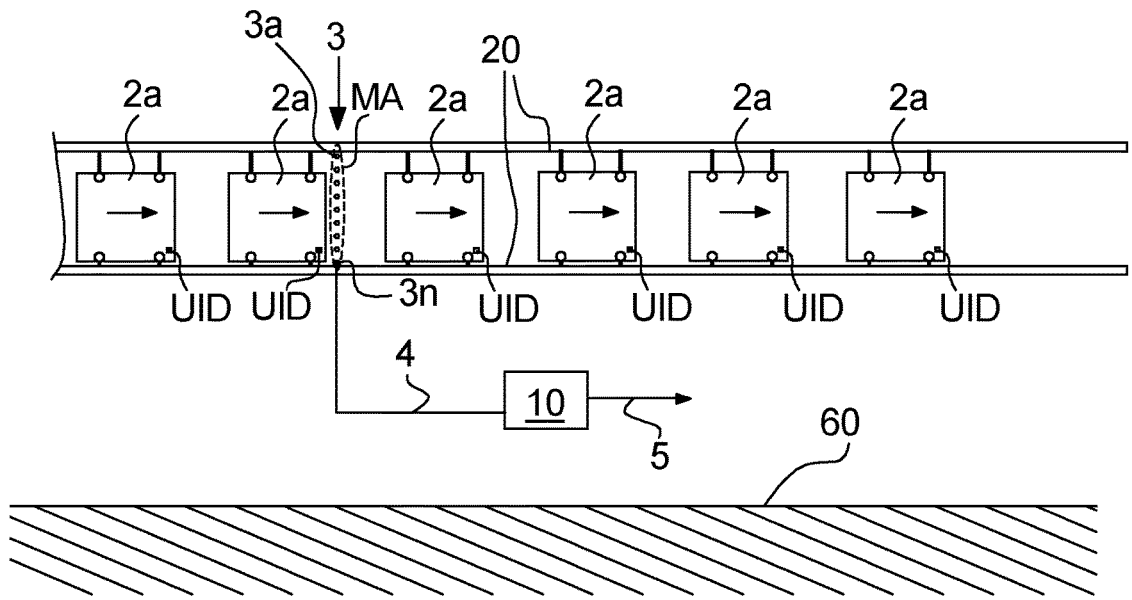
FIG. 14a-14b: Illustrates arranging panes vertically during measuring according to embodiments of the present disclosure.
Figure 14B:
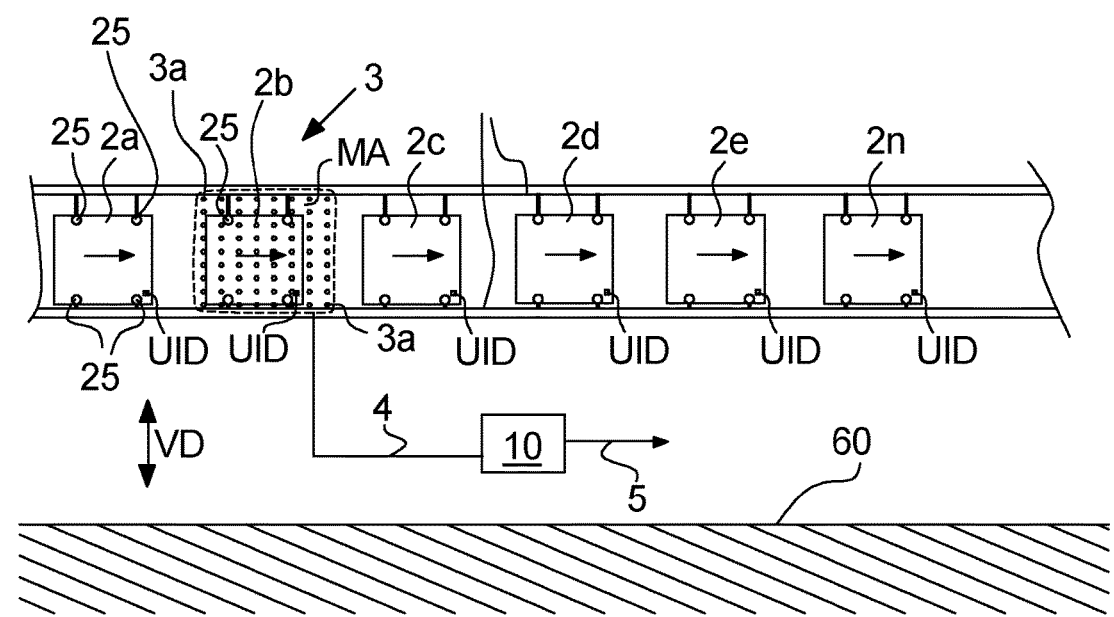

FIG. 14*a*-14*b* illustrates an embodiment of the present disclosure where the measurement to determine surface variations is done with substantially vertically positioned panes, in FIG. 14*a* with a row of sensors, and in FIG. 14*b* with a grid of sensors. The measuring arrangement 3 used when the panes are arranged vertically may thus, in this embodiment, be a measuring arrangement 3 as described in accordance with various embodiments above or below in relation to FIG. 11 and/or FIG. 12.

The vertically positioned panes helps to reduce gravity effects acting on the panes and influencing on the surface variations of the panes compared to if the panes are kept substantially horizontally during the measuring. It is however to be understood that in other embodiments of the present disclosure, the panes may be kept substantially horizontal during the measuring.

In this embodiment, the panes 2*a*-2*n* are held in a vertical position by the pane transportation arrangement 20 above the floor level 60, and extend in vertical direction VD. The pane transportation arrangement 20 in this embodiment comprises pane fixation devices 25 such as suction cups or the like, arranged to hold the pane at the pane surface intended to face away from the gap 8 of the VIG after the pane has been paired physically with another pane.

The transportation arrangement 20 may comprise pane fixation devices 25 to hold the respective pane 2*a*-2*n* both at the top and bottom at one or more locations, to reduce the risk of unintended movement of the pane towards or away from the measuring arrangement 3 during the measurement.

A relative movement between the panes 2*a*, 2*b* during or between measuring of surface variations may thus be provided in preferred embodiments of the present disclosure.

The measuring arrangement 3 thus provides input to the system 10 for processing topography representations TOPREP, and preferably provide surface distance characteristics SDC and/or manufacturing layouts MAL, and providing an output data 5 accordingly as described above according to various embodiments of the present disclosure according to one or more of the figures.

It is naturally to be understood that in other embodiments of the present disclosure as illustrated in FIGS. 1, 4 and 13, the panes 2*a*-2*n* may be kept horizontally during the measuring, by lying on a horizontally arranged surface or held horizontally by suction cups or the like.

Figure 15:
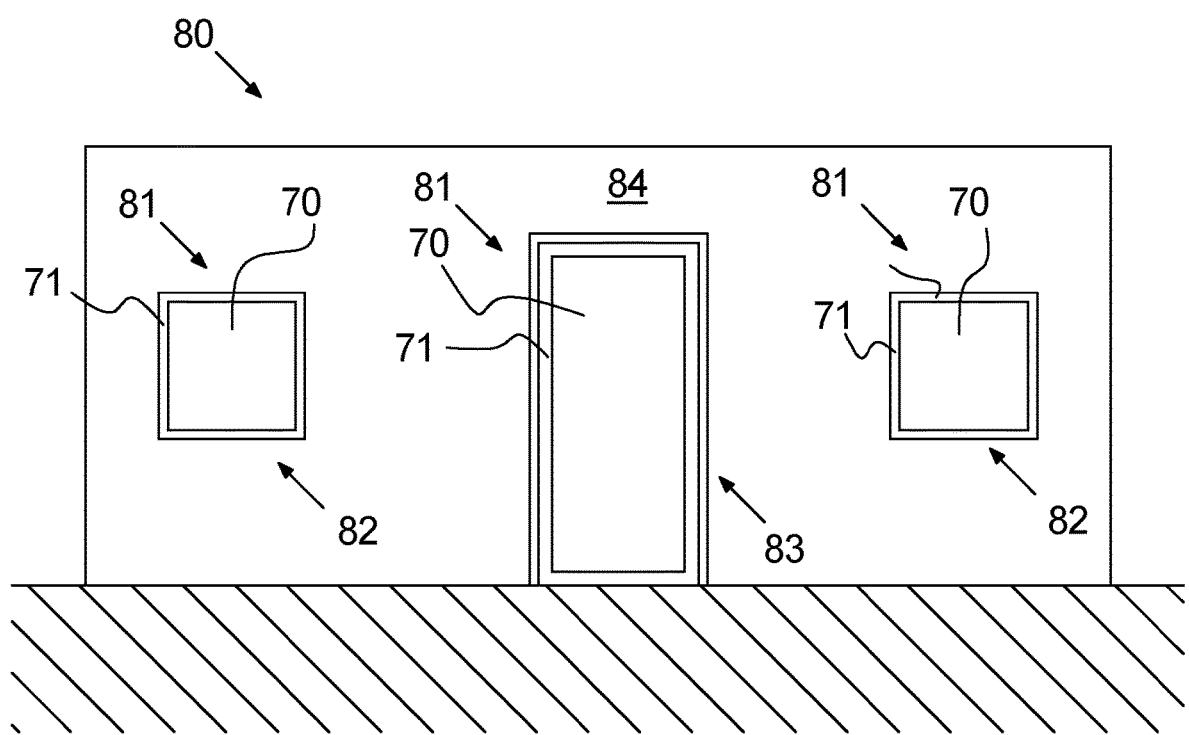
FIG. 15: illustrates a building comprising VIG units according to embodiments of the present disclosure.

FIG. 15 illustrates a building 80 seen from the outside/exterior, comprising apertures 81 for windows 82 and a door 83 in the outer wall 84 of the building 80.

The apertures 81 are covered by VIG units 70 manufactured in accordance with one or more of the embodiments of the present disclosure described in this document. The VIG units 70 are placed in a frame 71, and the frame 71 is then attached by fastening parts (not illustrated) such as mechanical fastening parts in the form of one or more hinges, screws, nails, mounting and/or the like to the wall 84.

Generally, it is to be understood that the panes described in this document and used for VIG assemblies/units are preferably transparent to light such as light having a wavelength in the range of about 400 nm to 700 nm to at least such a degree which enables humans to see through the panes. Also the panes may be configured so that infrared light (about 700 nm to 1 mm) is transmitted through the pane.

In the illustrated example of the VIG heating and gap evacuation station MAST5, this station comprises two furnaces 40, to be able to provide a manufacturing speed corresponding to the manufacturing speed of MAST2-MAST4. In other embodiments of the present disclosure, only one furnace 40 may be used, and in other embodiments, more than two furnaces may be used.

It is to be understood that in embodiments of the present disclosure the measuring provided at the measuring station MAST may be provided away from the subsequent stations MAST1-MAST5. At another geographical location, and that data 5 may thus in further embodiments of the present disclosure be transmitted over the internet or in any other way to the relevant manufacturing stations, where the data may be utilized and identified in accordance with scanned pane identifications UID.

In embodiments of the present disclosure which is not illustrated, said measuring arrangement 3 may comprise sensors and a data processing system configured to measure a surface variation at both sides of the pane, simultaneously, and provide topography representations (TOPREP_2*a*-TOPREP_2*n*) and other information based thereon, as described above. Thus, a measuring arrangement may be placed at each side of the pane.

In general, it is to be understood that the present disclosure is not limited to the particular examples described above but may be adapted in a multitude of varieties within the scope of the present disclosure as specified in the claims.

For example, it is understood that a VIG unit at least comprises two, parallel glass panes separated by the gap 8, but may also in further embodiments comprise more than two glass panes, three glass panes, where a middle glass pane is arranged between the two glass panes each having a surface facing a gap 8, and where the other surface of these glass panes face the exterior, and the middle glass pane's surfaces thus faces two evacuated gaps 8. It is naturally to be understood that in accordance with the present disclosure, Topographic representations relating to these three panes may be processed, a surface distance characteristic for each of the gaps of such a VIG may be determined to enable manufacturing corresponding to the surface variations of the panes, manufacturing layouts may be provided comprising pillar type information, orientation information etc.

may be provided for such VIG units as disclosed above.

Moreover, it is to be understood that the VIG assemblies or units provided in accordance with the various embodiments described above, preferably are suitable to be used in for covering apertures such as window and/or door openings in a building, it is naturally understood that the VIG units might also be used for purposes in further embodiments of the present disclosure.

It is moreover generally to be understood that the data processing of measurement data 4, and/or other data processing of topography representations, SDC etc. may be provided at a central server arrangement in further embodiments of the present disclosure. It is also generally to be understood that the data storage(s) DS described in this document may be placed in any suitable location, and be part of a central database accessible over the internet or an internal network such as a Local Area Network or Wireless LAN.

Accordingly, the data 5 may be accessed/retrieved by the data processor arrangements 6, 12, 24, 32 in various embodiments of the present disclosure from a central database.

The present disclosure provides a manufacturing process for VIG units that are based on estimated resulting surface distance characteristics which have been determined based on an initial measurement to determine individual topographic representations. Hence, the VIG unit may be manufactured based on the individual surface characteristics of the respective pane combinations and may result in an improved estimated/expected lifetime of VIG units made using this manufacturing process.

The manufacturing process may provide a more compact manufacturing line. Additionally, the individual topographic representations of the surfaces of the glass panes provides more freedom in combinations of panes and/or support pillars to provide an improved, VIG unit, while also basing heights of the support pillars at least partially on the gap between the panes to be combined.

Furthermore, the manufacturing process provides the freedom of where the topographic representations and/or the estimated surface distance characteristics are determined.

Moreover, the estimated resulting surface distance characteristic and/or details regarding the individual VIG unit components may be used at a later stage for traceability in order to improve the manufacturing of VIG units.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in scope with the present disclosure. Additionally, while various embodiments of the present disclosure have been described, it is to be understood that aspects of the present disclosure may include only some of the described embodiments or combinations of the various embodiments. Accordingly, the present disclosure is not to be seen as limited by the foregoing description.

LIST

1: Manufacturing facility
2a-2n: pane elements 2a-2n
3: Measuring arrangement
3_1-3_n: Sensor(s) of measuring arrangement
4: Input from measuring arrangement
5: Data output
6, 12: Processing arrangement
8: Gap between panes of VIG
9: Support pillar
10: System for processing topography representations, and preferably provide surface distance characteristics and/or manufacturing layouts
13: Evacuation opening
14: Edge sealing
15: Evacuation opening sealing
17: communication between processing arrangement and data storage to store and/or retrieve Surface distance characteristics
18: communication to store topographic representations
20: Pane transportation arrangement
21a, 21b: Pane surfaces
22: Support pillar storage
23: Support pillar placement arrangement
24: Pillar distribution controller
30: Pane placement arrangement
31: Suction cup arrangement comprising one or more suction cups
32: Pane placement controller
40: Heating furnace
42: Suction cup arranged over evacuation opening
41a-41n: Support trollies or other types of support arrangements for supporting VIG assemblies during heating
50: VIG assembly substantially ready for heating/baking and/or evacuation
DS, DS1: Data storages/memory
SDC, SDC1-SDCn: Surface distance characteristic
SPAR1-SPARn: Support areas where support pillars are arranged to support the panes to obtain gab in TOPREP_2A-TOPREP_2N VIG unit
D, D1-Dn: Distance between panes of a VIG unit
H: Height of support pillar.
TOPREP: Topographic representation of a surface of a pane
PA_ID: Pane identification
H1-Hn, Hy: Pillar heights for different pillars/Pillar types
HI1-HIn, HI1_1-H12_3: Height representation of a pane surface at a support area
MAL-MALn: Manufacturing layout
PTI: Pillar type information
PT1-PTn: Pillar type
PA_OR: Orientation information
MD: Pane movement direction
MA: Measuring area for measuring arrangement
MAST1: Measuring station
MAST2: Support pillar distribution station
MAST3: Edge sealing distribution station
MAST4: pane pairing station
MAST5: VIG heating and gap evacuation station

The invention claimed is:

1. A method of selecting a pillar type for vacuum insulating glass (VIG) units, comprising the steps of:
providing a plurality of glass panes;
obtaining individual topographic representations of different support areas of each glass pane of the plurality of glass panes based on input from a measuring arrangement;
determining surface distance characteristics by a data processing arrangement, wherein the surface distance characteristics represent comparisons between different combinations of the plurality of glass panes based on the individual topographic representations;
storing one or more of the surface distance characteristics in a data storage;
selecting a first glass pane and a second glass pane of the plurality of glass panes based on the surface distance characteristics; and
identifying a first pillar type to be placed at predefined support areas within a gap between the first glass pane and the second glass pane.

2. The method according to claim 1, further comprising: associating pane identification information with the stored surface characteristics for different support areas of at least a portion of the plurality of glass panes.

3. The method according to claim 1, further comprising: selecting one or more manufacturing layouts based on the stored surface distance characteristic.

4. The method according to claim 3, wherein the first pillar type is based on the one or more manufacturing layouts.

5. The method according to claim 1, wherein said one or more manufacturing layouts comprises information relating to the first pillar type and/or wherein the first pillar type is based on pillar representation data and the stored surface distance characteristic.

6. The method according to claim 1, wherein the first pillar type is selected based on at least one of pillar height, pillar material, pillar hardness, pillar density, and pillar shape.

7. The method according to claim 1, further comprising: distributing support pillars of the first pillar type at the predefined support areas.

8. The method according to claim 1, further comprising: identifying a second pillar type to be placed at different predefined support areas of at least one of the first glass pane and the second glass pane.

9. The method according to claim 8, wherein the second pillar type is based on at least one of the one or more manufacturing layouts, pillar representation data, and the stored surface distance characteristic.

10. The method according to claim 8, further comprising: distributing support pillars of the second pillar type at the different predefined support areas.

11. The method according to claim 1, wherein the support pillars of at least one of the first type and the second type have different heights.

12. The method according to claim 3, comprising orienting the first glass pane and the second glass pane relative to each other towards a preferred orientation based on the surface distance characteristics and the one or more manufacturing layouts.

13. The method according to claim 1, wherein said step of storing one or more of the surface distance characteristics comprises storing surface distance characteristics that are within a predetermined tolerance band in a data storage.

14. The method according to claim 1, wherein said first and second glass panes are arranged and aligned opposite to each other with said support pillars of the first type placed between the first and second glass panes.

15. The method according to claim 1, wherein an edge sealing is provided for sealing said gap between said first and/or second glass pane.

16. The method according to claim 1, wherein said gap between said first and second glass panes is evacuated and subsequently sealed.

* * * * *